United States Patent
Larsson et al.

(10) Patent No.: US 8,295,173 B2
(45) Date of Patent: Oct. 23, 2012

(54) END-TO-END CONSIDERATE LINK CONTROL AND ROUTING IN A MULTIHOP NETWORK

(75) Inventors: Peter Larsson, Solna (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 11/919,880

(22) PCT Filed: Jul. 1, 2005

(86) PCT No.: PCT/SE2005/001090
§ 371 (c)(1),
(2), (4) Date: Nov. 5, 2007

(87) PCT Pub. No.: WO2007/004935
PCT Pub. Date: Jan. 11, 2007

(65) Prior Publication Data
US 2009/0052327 A1    Feb. 26, 2009

(51) Int. Cl.
*H04L 1/00* (2006.01)
(52) U.S. Cl. ........ 370/231; 370/232; 370/233; 370/234; 370/238
(58) Field of Classification Search .............. 370/238, 370/231, 232, 233, 234
See application file for complete search history.

(56) References Cited

U.S. PATENT DOCUMENTS

| | | | |
|---|---|---|---|
| 6,405,046 B1 * | 6/2002 | Kumaran et al. | 455/453 |
| 2003/0161268 A1 * | 8/2003 | Larsson et al. | 370/229 |
| 2004/0219922 A1 | 11/2004 | Gage et al. | |
| 2005/0014464 A1 * | 1/2005 | Larsson | 455/11.1 |
| 2005/0053007 A1 | 3/2005 | Bernhardt et al. | |
| 2005/0111428 A1 | 5/2005 | Orlik et al. | |
| 2006/0046658 A1 * | 3/2006 | Cruz et al. | 455/67.11 |
| 2006/0206857 A1 * | 9/2006 | Liu et al. | 717/104 |

FOREIGN PATENT DOCUMENTS

WO    WO 03/071751    8/2003

OTHER PUBLICATIONS

International Search Report dated Mar. 8, 2006.

(Continued)

*Primary Examiner* — Huy D Vu
*Assistant Examiner* — Omer Mian
(74) *Attorney, Agent, or Firm* — Nixon & Vanderhye P.C.

(57) ABSTRACT

By introducing a novel parameter common to all links along the entire multihop route it is possible to more flexibly allocate, for each of a number of the links, a set of three interdependent link transmit parameters representative of link transmit energy, link transmit time or link transmit bandwidth or link code word consumption, and link transmit power. Basically, the common parameter is determined based on a given end-to-end (ETE) transmit parameter constraint for the entire multihop route. The idea is then to assign or allocate, for each considered link, the three interdependent link transmit parameters based on the common parameter and local link characteristics. In this way, all three link transmit parameters may (and generally will) be different between at least two links on the route when the links have different link characteristics, assuming that each link transmit parameter is also dependent on the local link characteristics. Preferably, the common parameter is determined in the process of optimizing a given objective ETE function.

24 Claims, 11 Drawing Sheets

OTHER PUBLICATIONS

Pursley et al., *Routing in Frequency-Hop Packet Radio Networks with Partial-Band Jamming*, IEEE Transactions on Communications, vol. 41, No. 7, Jul. 1993, pp. 1117-1124.

Lauer, *Packet-Radio Routing*, Routing in Communications Networks, 1995, p. 387.

Alman, Spatial reuse through dynamic power and routing control in common-channel random-access packet radio networks, The University of Texas at Dallas, 1988, 170 pages, AAT 819307.

Supplemental European Search Report, Jun. 14, 2010, in corresponding European application No. EP 05 75 6669.

Chiasserini et al., Optimal Rate Allocation for Energy-Efficient Multipath Routing in Wireless Ad Hoc Networks, IEEE Transactions on Wireless Communications, vol. 3, No. 3, May 2004, pp. 891-899.

European Office Action dated Jun. 29, 2011, issued in corresponding European Application No. 05 756 669.7-2416.

* cited by examiner

----- NEIGHBOUR CONNECTION
——— PART OF TREE

——— ROUTING PATH
☐ PACKET

END-TO-END CONSIDERATE LINK CONTROL AND ROUTING IN A MULTIHOP NETWORK

This application is the U.S. national phase of International Application No. PCT/SE2005/001090 filed 1 Jul. 2005 which designated the U.S. and the entire contents of which is hereby incorporated herein by reference.

TECHNICAL FIELD

The technology described herein generally relates to multihop networks, and more particularly to the control of link parameters for a selected multihop route as well as routing in a multihop network.

BACKGROUND

Multihop networks have been discussed as a key technology for future wireless communication techniques, due to inherent power/energy efficiency and ability to connect nodes out of range via intermediate relaying nodes at feasible power/energy levels. In a multihop network, nodes out of reach from each other may benefit from intermediately located nodes that can forward their messages from the source towards the destination. Traditionally, multihop networks have often been associated with so called ad hoc networks where nodes are mostly mobile and no central coordinating infrastructure exists. However, the idea of multihop networking can also be applied when nodes are fixed. In addition, one can also envision central coordination, in particular when nodes are fixed and channels are robust. One may also envision hybrid networks involving wired links in addition to wireless links in multihop networks.

Routing generally involves the basic tasks of determining suitable routing paths and transporting information through the network. The first of these tasks is normally referred to as route determination and the latter is often referred to as packet forwarding.

In source-routing, it is normally assumed that the source end node determines the entire route. The intermediate nodes then merely act as store-and-forward units, mindlessly forwarding the packet to the next node on the path to the destination node.

In hop-by-hop routing, each node basically determines and maintains a routing table with information, for each of a number of destinations, of a preferred next hop node. When a node receives a packet, it forwards the packet to the next hop node on the basis of information on the destination of the packet. The forwarding process continues from node to node until the packet reaches the destination.

The network nodes pass routing information and maintain their routing tables through the transfer of various routing information messages. The routing information naturally varies depending on the particular routing scheme used.

Hop-by-hop routing schemes are normally categorized into two main classes, namely link-state and distance-vector algorithms. Link-state algorithms generally flood routing information to all nodes (however solutions flooding only part of the network also exist), but each node then only sends information describing the state of its own links. Distance vector algorithms on the other hand are based on exchanging routing cost information only between neighboring nodes.

A classical approach is to span a so-called routing tree. FIG. 1A illustrates an example of such a routing tree, here rooted at a given destination node. In multihop networks, it is well known to calculate the routing tree based on a shortest path algorithm, implying that the determined shortest paths from the various nodes in the tree to the destination node are so-called "least cost paths". Each link is then normally characterized by a delta cost, and each node is assigned an accumulated cost to reach the destination along the determined shortest path. In practice, the tree is continuously updated to manage mobility and changing link conditions.

The Bellman-Ford shortest path algorithm is a well known example of a shortest path algorithm (the Dijkstra algorithm is another example of classical routing algorithms). The Bellman-Ford algorithm has played a central role in wired networks such as the Internet, but also has an important function in wireless multihop networks. An advantage of the Bellman-Ford algorithm is that it can provide shortest path determination in a distributed and "uncoordinated" fashion. It also guarantees convergence within a finite time period based on the exchange of routing cost information between neighboring nodes.

For the Bellman Ford algorithm, the cost $c_i$ of a node $v_i$ for each destination d of a given set of destinations may thus be determined through the distributed Bellman Ford equation:

$$C_i^{(d)} = \min_{\forall j \in N_i} \{\Delta C_{ij} + C_j^{(d)}\}, \quad (1)$$

where $v_j \in N_i$ is the neighbor index of neighbor nodes belonging to node $v_i$, $C_j^{(d)}$ is the cost for neighbor $v_j$ to reach destination d, and $\Delta C_{ij}$ is the cost to go from node $v_i$ to $v_j$ (i.e. the cost for a hop, or the link cost).

The number of iterations may be limited to an integer number, thereby upper limiting the number of hops, e.g. a maximum of two hops.

Anyway, when a particular node in the tree wants to send a packet in the subsequent packet forwarding process, the node is considered a source node, and the packet follows the determined routing path from the source to the destination, as illustrated in FIG. 1B. Different nodes may send packets to the same destination over time; hence different nodes will act as source nodes and send along their respective shortest path. In addition, as multiple destinations may exist, multiple trees may be generated, each rooted at a corresponding destination. When transmitting packets in the forwarding process, the nodes employ link control such as link adaptation and/or power control to provide efficient transmission.

As indicated above, a common objective of the routing schemes is normally to find a path that is optimal in some sense. For example, the expression "shortest path" normally corresponds to a minimum cost path, implying that the path or route is a path that offers the minimum cost with respect to some particular cost metric.

For instance, a common routing scheme in non-slotted channel access is to keep the transmit power constant for all hops, assuming that all hops experience different path losses, and selecting the path that offers the least accumulated transmit time (or delay).

In this context, an example of a suitable link metric is to use the estimated average link rate and define link cost as the inverse of the average link rate, i.e. $\Delta C_{ij} = 1/\bar{r}_{ij}$, assuming rate adaptation capabilities. This metric can be seen in two ways. First, for a fixed sized packet, it strives to offer minimum transmit time paths (assuming that the queuing delay in the network is negligible). However, in the context of a multihop scheme with a fixed sized data phase (with varying number of packets in the data phase depending on rate adaptation) it offers the least time resource utilization along a path. The average rate based link metric can be estimated by the classical Shannon capacity:

$$\bar{r}_{ij} = B \cdot E\left(\log_2\left(1 + \frac{G_{ij}P_i}{\sigma_N^2}\right)\right), \quad (2)$$

where B is the bandwidth (may be neglected if only one common bandwidth is used in the whole system), $E\{\ldots\}$ is the expectation value, $P_i$ is the transmit power of node $v_i$ (which may be fixed or determined by some other mechanism), $\sigma_N^2$ is the noise level (at node $v_j$). The term, $\sigma_N^2$ could potentially also include average interference, then modeled as complex Gaussian noise, apart from receiver noise.

The same strategy may be used for a slotted channel access scheme, but then, instead of delay, the end-to-end time utilization for a message will be minimized. Even if this does not minimize the physical layer delay, since the delay will be the number of hops times the duration, it to some extent heuristically strives to enable packing of as many user-transmissions in a multihop network as possible.

Another common scheme in slotted channel access assumes that the rate per hop is the same (and hence the transmit time per packet or per bit) for all hops, and then the end-to-end (aggregate) power is minimized by power allocation over involved nodes. Alternatively, for identical rate over all hops, it may be sufficient to minimize the aggregate path loss.

An example of a possible metric in this context is to use the average link gain $G_{ij}$ and define link cost as the inverse of the average link gain [1], i.e. $\Delta C_{ij} = G_{ij}^{-1}$. This metric provides large receiver SNR (Signal-to-Noise Ratio) values (with fixed power), and minimum power routes (with power control).

Determining the minimum power routes by using the Shannon capacity for a desired target link rate $\bar{r}_{i,j}^{(Target)}$ yields:

$$P_i = \left(2^{\frac{\bar{r}_{i,j}^{(Target)}}{B}} - 1\right)\frac{\sigma_N^2}{G_{ij}} \propto \frac{1}{G_{ij}} \quad (3)$$

This generally corresponds to the case of the inverse path gain metric described above, if one assumes a single common target link rate over all links.

Reference [2] describes the use of link transmit power as a reasonable cost metric to minimize the cumulative transmit power used over an entire path. This is good for battery consumption and also reduces the interference level in the system, leaving space for new connections and thus allowing operation at higher network load.

It is possible to include interference in the metrics. Interference-based type of metrics include Least Interference Routing (LIR) [3], where the idea is to use a route that causes the least destructive interference, and Least Resistance Routing (LRR) [4], where the idea is to use the route encountering the least interference.

It is also possible to include traffic load in the metric. However, including such traffic aspects in the metric (e.g. incorporating aspects of traffic load and medium access rules) is not straightforward, as one then also needs to consider stability issues.

As indicated, traditional routing schemes typically ensure that the path taken minimizes accumulated link costs such as the accumulated transmit time (or delay), the accumulated or aggregate transmit power or the number of hops, allowing some link transmit parameter (e.g. link transmit power or link rate) to vary while keeping at least one other link transmit parameter constant (e.g. link rate or transmit power) over all links.

SUMMARY

The technology described herein overcomes these and other drawbacks of the prior art arrangements.

It is a general object to more efficiently assign or allocate link transmit parameters in a multihop network.

It is a specific object to more optimally utilize the available network resources for transmitting information over the links of a multihop route. In particular it is desirable to ensure a certain quality for the route and at the same time optimize (minimize) the use of expensive resources such as transmit energy or power.

It is a specific object to provide an improved method and arrangement for controlling link transmit parameters for a route in the multihop network.

It is also a specific object to more efficiently perform routing in a multihop network.

These and other objects are met by the accompanying patent claims.

As previously described, traditional routing schemes ensure that the path taken minimizes accumulated link costs, 9such as the accumulated transmit time (or delay), the aggregate transmit power, or the number of hops), allowing some link transmit parameters to vary while keeping at least one of the other link transmit parameters constant over all links. However, a thorough analysis by the inventors reveals that this is indeed a serious constraint that has negative impacts on the control and adaptation of the transmit parameters on the link level including issues such as link adaptation and power control.

The inventors have recognized that by introducing a novel parameter common to all links along the entire multihop route it is possible to more flexibly allocate, for each of a number of the links, a set of three interdependent link transmit parameters representative of a) link transmit energy, b) link transmit time or link transmit bandwidth or number of link transmit code words (link code word consumption), and c) link transmit power. Basically, the common parameter is determined based on a given end-to-end (ETE) transmit parameter constraint for the entire multihop route. The idea is then to assign or allocate, for each considered link, the three interdependent link transmit parameters based on the common parameter and local link characteristics. In this way, all three link transmit parameters are generally different between at least two links on the route when the links have different link characteristics, assuming that each link transmit parameter is also dependent on the local link characteristics.

Preferably, two of the three interdependent link transmit parameters are explicitly determined for use when transmitting information over the respective link, and the remaining link transmit parameter is 'merely' given by the interdependence of the three link transmit parameters.

The common parameter used for the flexible assignment/allocation of link transmit parameters of the invention may for example be determined in a heuristic approach, for example using relatively simple rules of thumb.

Alternatively, in a more systematic approach, the common parameter is determined in the process of optimizing a given objective end-to-end (ETE) function with respect to, for each considered link, one of the link transmit parameters under consideration of the given ETE constraint.

A first link transmit parameter may then be determined based on the common parameter and local link characteristics, and a second link transmit parameter may be parameterized by the first link transmit parameter and determined as a function of the first link transmit parameter and the local link characteristics. The determined parameters may be used for advanced link control including issues such as joint link rate adaptation and link power control.

Advantageously, the three fundamental physical parameters power, time/bandwidth/code words and energy are considered, selecting one of the parameters for end-to-end optimization under the constraint of another one of the parameters for a given multihop route. More generally, the objective ETE function is selected to include one of the following ETE (end-to-end) transmit parameters:

a) an ETE transmit parameter representative of ETE transmit energy;
b) an ETE transmit parameter representative of ETE transmit time or ETE transmit bandwidth or ETE number of transmit code words (ETE code word consumption); and
c) an ETE transmit parameter representative of ETE transmit power, while another one of the end-to-end (ETE) transmit parameters acts as the ETE constraint.

The actual choice of objective ETE function and ETE constraint depends on overall design goals and performances objectives. For example, an ETE transmit parameter representative of ETE transmit energy may be optimized under a constraint on an ETE transmit parameter representative of ETE transmit time or ETE transmit bandwidth or ETE number of transmit code words. Alternatively, an ETE transmit parameter representative of ETE transmit time/bandwidth/ number of code words is optimized under an ETE energy constraint. Yet another example involves optimization of an ETE transmit parameter representative of ETE transmit power under a constraint on an ETE transmit parameter representative of ETE transmit time or ETE transmit bandwidth or ETE number of transmit code words, or vice versa.

When an ETE transmit parameter representative of ETE transmit time/bandwidth/number of code words is optimized, the actual ETE objective function may include ETE throughput and/or the aggregate number of sub carriers used over the entire route.

An example of a suitable optimization method is the Lagrange multiplier method, where the common parameter is representative of the Lagrange multiplier.

In an exemplary practical realization, the common parameter is distributed to a number of nodes along the multihop route to enable each of the nodes to determine the set of interdependent link transmit parameters. To enable adaptation, link transmit parameter information related to the selected ETE constrained transmit parameter is preferably collected along the route, and an aggregated ETE transmit parameter value is formed based on the collected link information. The aggregated ETE transmit parameter value may then compared with the given ETE transmit parameter constraint to decide if the ETE performance is acceptable or if the common parameter needs to be re-calculated and re-distributed to the relevant nodes.

Normally, each of the link transmit parameters is non-linearly dependent on local link characteristics such as the path-gain-to-noise ratio, and the common parameter is determined based on non-linear processing, e.g. by solving a corresponding system of (coupled) non-linear equations.

The technology described herein also proposes an extension of the above idea to enable route selection in the multihop network. Basically, the extended idea is to optimize a selected objective ETE function subject to a given ETE constraint for each of a number of possible routes, and select route among those routes that have the most optimum value of the objective ETE function. In this way, it is possible to jointly select optimum route and link parameters, achieving any desired ETE constrained parameter while optimizing another ETE transmit parameter.

The technology described herein offers the following advantages:
Efficient assignment/allocation of link transmit parameters in a multihop network;
Optimized use of available network resources, while meeting a given quality requirement;
Optimum ETE performance for a multihop route;
Efficient multihop routing;
Joint routing and ETE-considerate link control;
Improved link adaptation and power control strategy;
Reduced interference;
Reduced SAR (Specific Absorption Rates); and
Increased battery lifetime.

Other advantages offered by the technology described herein will be appreciated when reading the below description of example embodiments.

DETAILED DESCRIPTION OF EMBODIMENTS OF THE INVENTION

Figure 1A:
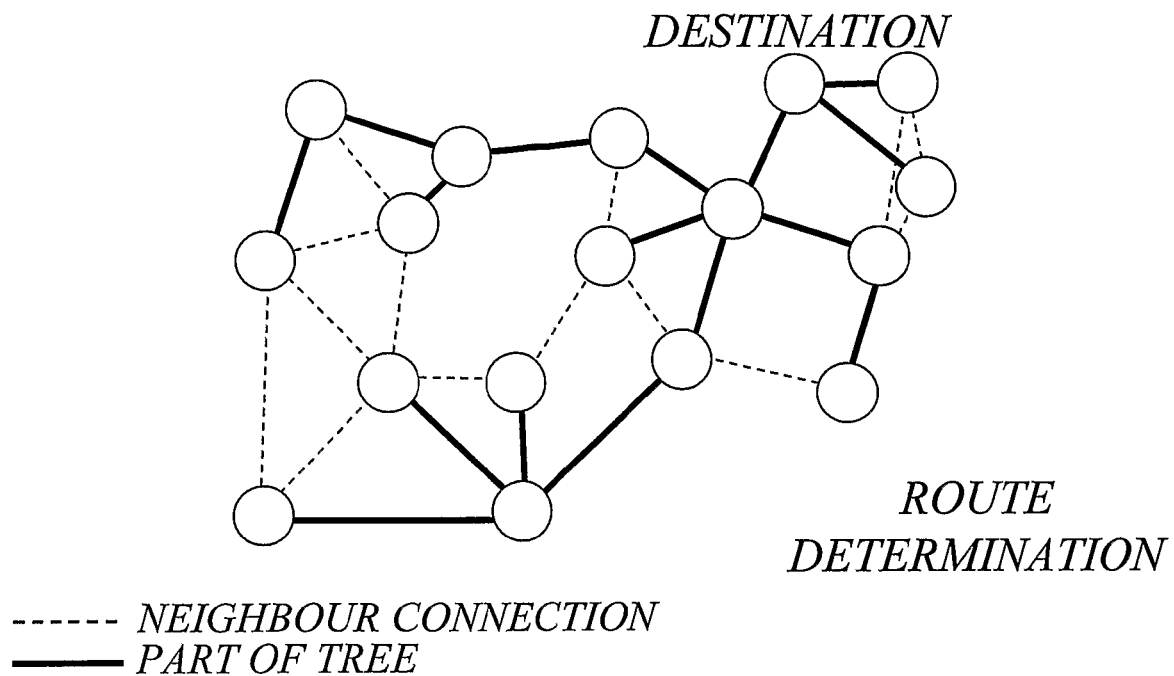
FIG. 1A is a schematic diagram illustrating an example of a traditional routing tree generated during route determination.
Figure 1B:
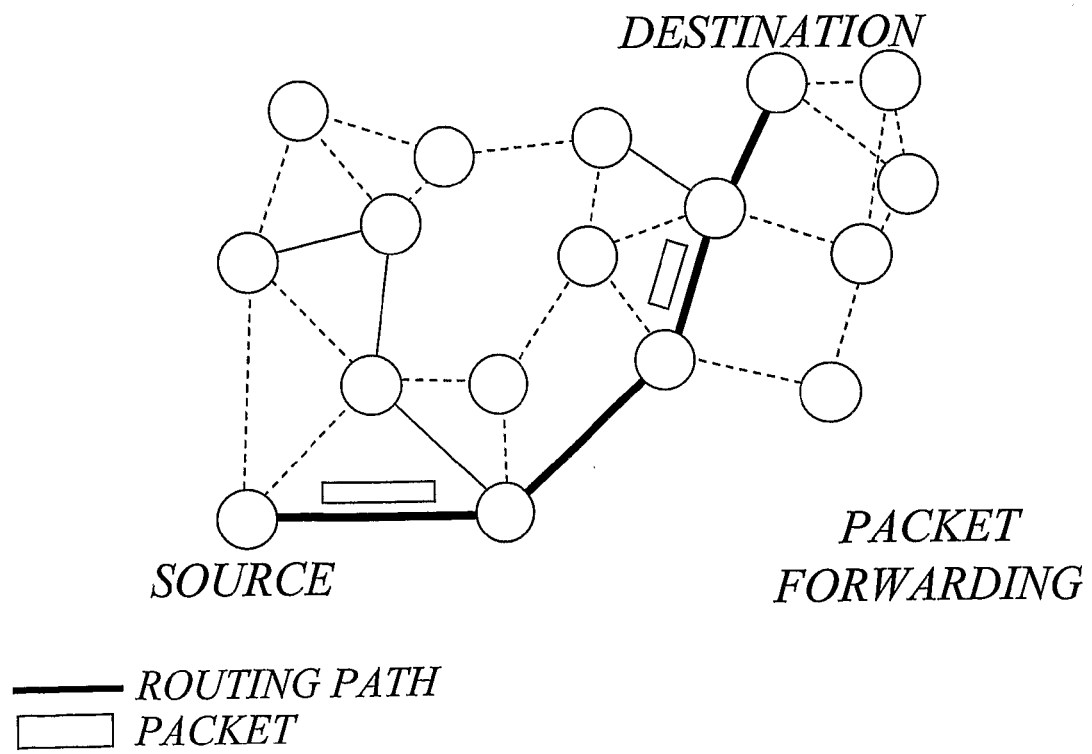
FIG. 1B is a schematic diagram illustrating packet forwarding between a source node and a destination node.

Throughout the drawings, the same reference characters will be used for corresponding or similar elements.

For a better understanding of the technology described herein, it may be useful to begin with a brief analysis of the prior art approach to routing and link control.

Briefly, in prior art multihop systems, a route is determined from minimizing accumulated link costs. A relevant aspect in this context is that the link costs are determined under the assumption that at least one of three fundamental (from classical physics) interrelated transmit parameters; power, time or energy, is assumed the same for all links, with path gain as variable. In particular, prior art generally assumes optimality for the ETE (end-to-end) path with the given selection of fundamental transmit parameters. At least two main aspects of the prior art can be improved.

It is recognized that there are three fundamental physical measures that can characterize a packet transmission over a link as well as the end-to-end multihop route; they are the power P, the time T and energy E. Those three are not independent, but follow the relation $$E = \int_0^T P(t)\,dt,$$

or more simply E=P·T when the power is constant over the packet transmission time T. Note that E=P·T holds directly for a link, but not directly for the ETE multihop route as it is then the sum of energy that is relevant.

First, traditional prior art techniques determine each link cost based on link path gain, under the assumption of another fixed and given link parameter. An example of this is minimum power routing that assumes flexible power setting and different path loss for each link, but only one common transmit duration on all links. It has been recognized that fixing one fundamental physical link parameter, as done in the prior art, is unnecessarily restrictive. Due to this, prior art schemes cannot approach the optimum trade off between ETE (end-to-end) characteristics of fundamental physical link parameters. An example, as will be proposed as an exemplary embodiment, involves the trade off between ETE energy (or power) and ETE transmit duration.

Due to the way routing is traditionally performed in multihop networks, by fixing one fundamental physical link parameter, the ability to perform flexible (and as we will see optimal) link control such as link rate adaptation and power control is unnecessarily restricted.

Secondly, it may be desirable to ensure a certain quality for a route, such as a maximum allowable accumulated transmit time (or equivalently delay) for a packet of arbitrary length L, and at the same time minimize the use of expensive resources such as energy (or power). Yet, it makes little sense to waste more resources (such as energy or power) to yield a lower delay than actually needed. Prior art have not addressed minimization of an ETE (end-to-end) fundamental physical link parameter (such as energy or power) under an ETE constraint (such as accumulated transmit time). Therefore, prior art methods unnecessarily waste valuable resources by meeting stricter requirements than needed.

The above problem analysis reveals that in prior art routing at least one of the three fundamental and interdependent link transmit parameters (transmit power, transmit time and transmit energy) is constant over all links. A basic idea according to the technology described herein is to introduce a novel parameter, not being any of the above fundamental link transmit parameters, that is common to all links along the entire multihop route, to allow for a more flexible assignment or allocation of link transmit parameters.

Figure 2:
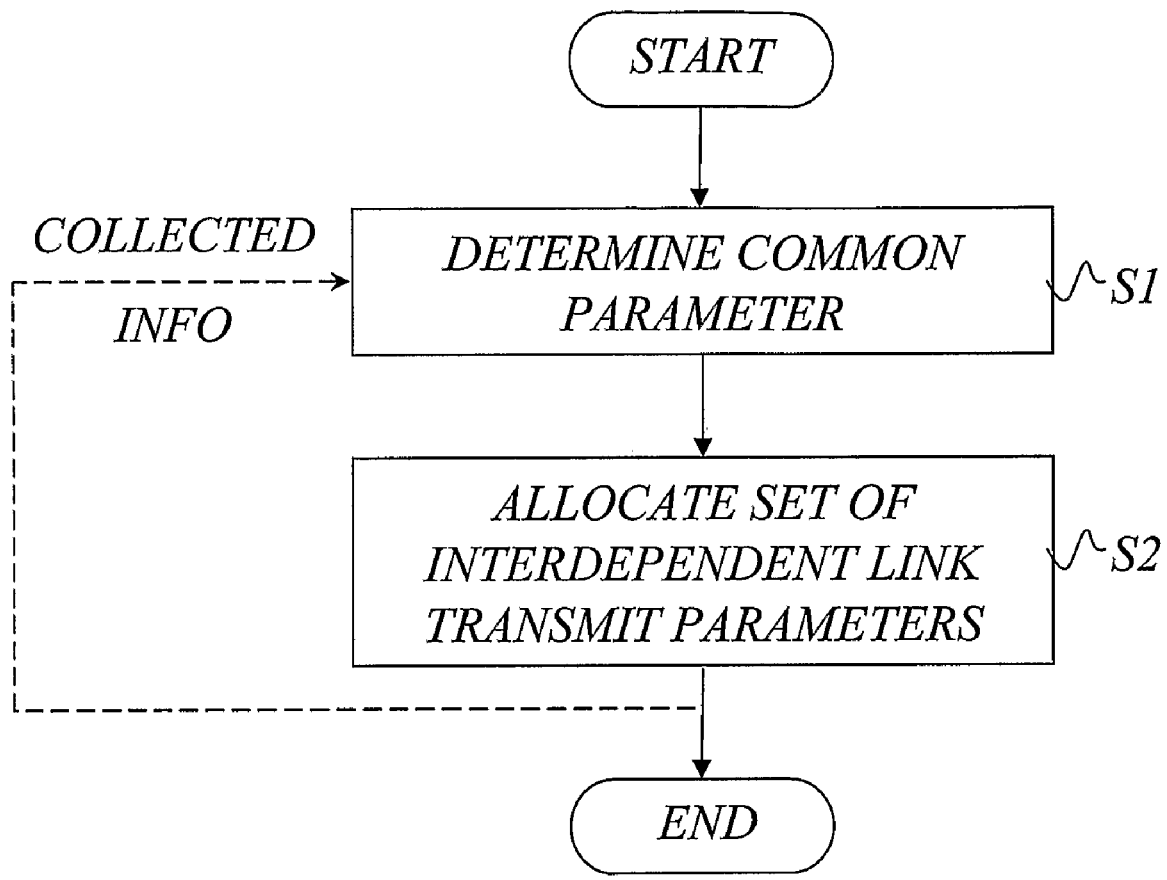
FIG. 2 is a schematic flow diagram of a basic method for controlling link transmit parameters for a multihop route according to a preferred example embodiment.

FIG. 2 is a schematic flow diagram of a basic method for controlling link transmit parameters for a multihop route according to a preferred embodiment. In step S1, the common parameter is determined, preferably based on a given end-to-end (ETE) transmit parameter constraint for the entire multihop route. In step S2, a set of the three interdependent link transmit parameters or representations thereof is then jointly allocated, for each considered link, based on the common parameter and local link characteristics. In this way, all three link transmit parameters are generally different between at least two links on the route when said links have different link characteristics, assuming that each link transmit parameter is also dependent on the local link characteristics. If desired, suitable link information related to the selected ETE constraint may be collected along the route and used for determining whether the common parameter needs to be adjusted, as indicated by the dashed line in FIG. 2.

Consequently the link transmit parameters may be more flexibly assigned since we have eliminated the restriction that one of the link transmit parameters have to be constant over all links. In this way, we also allow for a non-linear relationship between any of the fundamental physical link transmit parameters and path gain-to-noise ratio, in contrast to the prior art. The technology described herein also provides a more optimal link control strategy since we are not dealing with local link optimization, but rather ETE considerate link optimization. Advantageous effects of the improved link control strategy also include reduced overall interference, reduced SAR, and increased battery lifetime.

More generally, the assigned set of interdependent link transmit parameters includes:
  a) a parameter representative of link transmit energy ($E_i$);
  b) a parameter representative of link transmit time ($T_i$), or link transmit bandwidth ($B_i$ or $F_i$), or number of link transmit code words ($C_i$);
  c) a parameter representative of link transmit power ($P_i$).
As understood from the relation $$E = \int_0^T P(t)\,dt,$$

or more simply E=P·T, when two of the three interdependent link transmit parameters are determined, the remaining link transmit parameter is given by the interdependence of the three link transmit parameters. In practice, two of the three link transmit parameters are explicitly determined for use when transmitting information over the respective link, whereas the third parameter is given by the other two parameters. An example may be explicit determination of link transmit power and transmit time, where the transmit time is represented by the parameter of transmit rate that is effectively mapped into a modulation and coding scheme (MSC).

The common parameter used for the flexible assignment/allocation of link transmit parameters may for example be determined in a heuristic approach or by a more systematic approach.

In the latter case, a predetermined objective end-to-end (ETE) function is preferably optimized with respect to, for each considered link, a first link transmit parameter under consideration of a given ETE constraint. The Lagrange multiplier method is an example of a suitable optimization method, where the common parameter is representative of the Lagrange multiplier $\lambda$.

Advantageously, the three fundamental physical parameters power, time/bandwidth/number of code words and energy are for example considered, selecting one of the parameters for end-to-end optimization under the constraint of another one of the parameters for a given multihop route. For example, the objective ETE function is selected to include one of the following ETE (end-to-end) transmit parameters:

a) an ETE transmit parameter representative of ETE transmit energy (E);
b) an ETE transmit parameter representative of ETE transmit time (T), or ETE transmit bandwidth (B or F), or ETE number of code words (C); and
c) an ETE transmit parameter representative of ETE transmit power (P), while another one of the end-to-end (ETE) transmit parameters acts as the ETE constraint.

The actual choice of objective ETE function and ETE constraint naturally depends on overall design goals and performances objectives.

With links i and j, i≠j where $G_i \neq G_j$ (or really the gain to noise ratio differs) and when applied to all links along the route, this approach, in contrast to prior art, results in that all fundamental parameters may (and in practice will) differ for different links, i.e. $P_i \neq P_j$, $T_i \neq T_j$ and $E_i \neq E_j$. It should be noted that the time T, and $T_i$ can be replaced with another dynamic resource parameters such as F and $F_i$ (number of sub-carriers). Some characteristics of this exemplary scheme are:

Given the previous optimization, parameters are derived as a function of a parameter, such as the Lagrange multiplier λ, common to all links along the route.

All parameters $\{P_i, E_i, T_i\}$ are typically non-linear in $G_i$.

The net result is an optimum ETE performance for a given path.

In other words, in an exemplary preferred embodiment, the technology described herein jointly determines fundamental physical link transmit parameters (representative of power, energy and time) such that one fundamental physical ETE transmit parameter is minimized while another fundamental physical ETE transmit parameter acts as constraint.

The number of code words used per link is generically referred to as link code word consumption or link code word usage and the number of code words used in an end-to-end (ETE) perspective is generically referred to as ETE code word consumption or ETE code word usage.

The technology described herein will now be described with reference to an example that is based on centralized determination of the common parameter, which is distributed to the involved nodes for local assignment of the link transmit parameters. However, it should be understood that there is nothing that prevents that the determination of the common parameter is decentralized, and thus calculated in each node. On the other hand, if an overall centralized approach is desired, the common parameter as well as the set of link transmit parameters may both be calculated centrally. In this case, the link transmit parameters determined for a particular node are then forwarded to the node for implementation.

In fact, the technology described herein may be implemented with different degrees of centralized, decentralized, or distributed operation. Which approach is preferred depends on scenarios, preferences on architecture, how fast the channel changes, what the optimization goal is (average or instantaneous optimization), and so forth.

Figure 3:
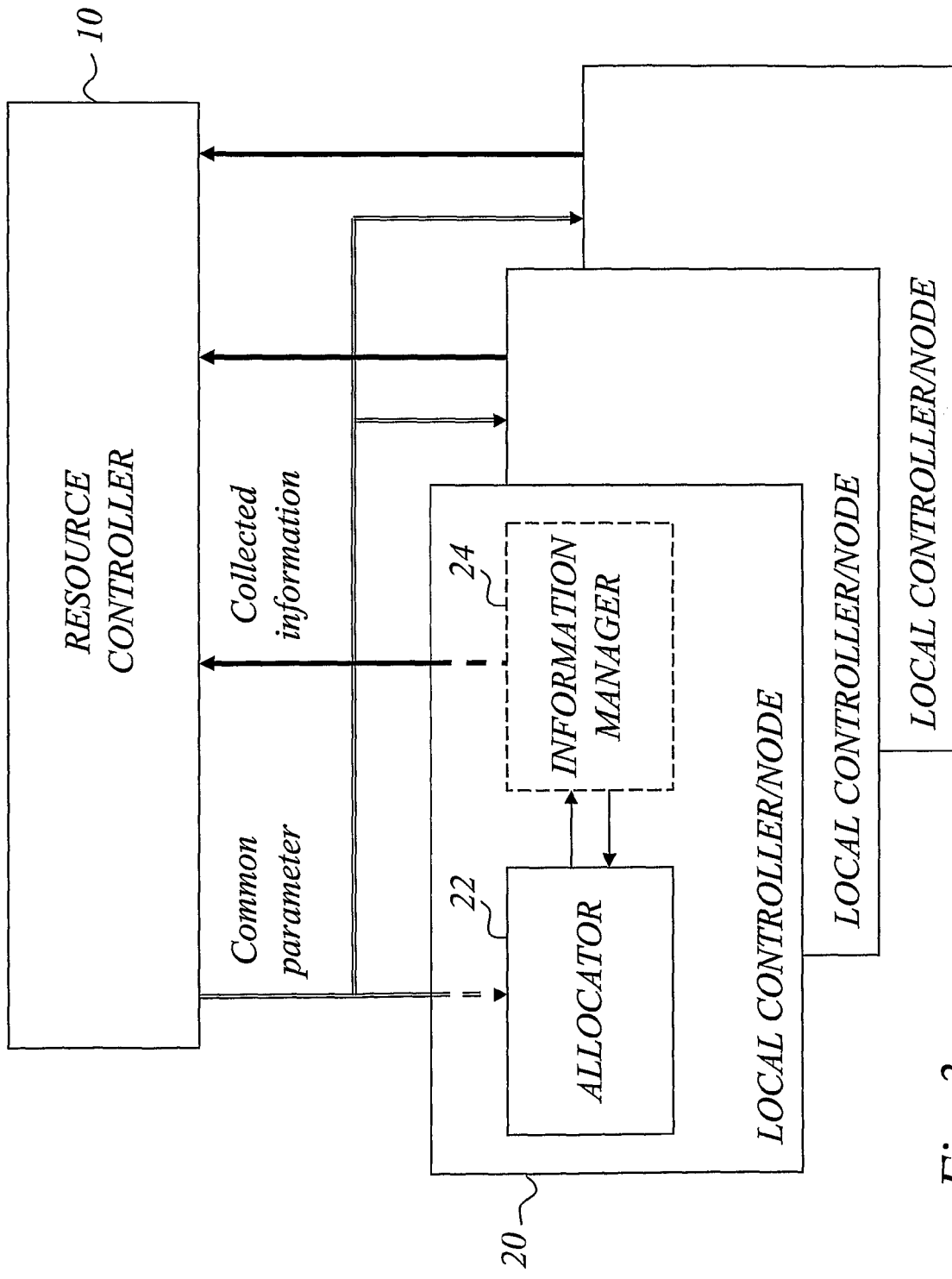
FIG. 3 is a schematic block diagram of an exemplary realization of an arrangement for controlling link transmit parameters according to a preferred example embodiment.

FIG. 3 is a schematic block diagram of an exemplary realization of an arrangement for controlling link transmit parameters according to a preferred example embodiment. Basically the arrangement comprises a central so-called resource controller 10 that determines the common parameter, which in some sense controls the actual allocation and utilization of the resources available for transmission of data on a route in the multihop network. The common parameter affects and connects the link optimization for different links. The resource controller 10 may for example be implemented in a dedicated control node or in a designated one of the nodes along the route. In this particular example, the controller 10 distributes the common parameter to the relevant nodes along the multihop route. Each node 20 comprises a local allocator 22 and optionally also a local information manager 24. Each local allocator 22 receives the common parameter, and basically allocates a corresponding set of interdependent link transmit parameters based on the common parameter and local link characteristics. Preferably, the information manager 24 determines the local link characteristics by suitable measurements and forwards this information to the allocator 22. Alternatively, the local allocator 22 is configured for determining the local link characteristics by itself. In addition to the local link characteristics, the information manager 24 may also determine local link transmit information related to the selected ETE constrained transmit parameter to enable adaptation of the common parameter in the controller 10. The information collected in each node is then transferred to the controller 10, which preferably forms an aggregated ETE transmit parameter value based on the collected information. Optionally, the allocator 22 may also inform the information manager 24 of the allocated link transmit parameters, which then preferably form part of the collected information. The aggregated ETE transmit parameter value may then be compared with the given ETE transmit parameter constraint to decide if the ETE performance is acceptable or if the common parameter needs to be re-calculated and re-distributed to the nodes.

The local link characteristic may for example be representative of path gain or path gain-to-receiver noise ratio, keeping in mind that the noise terms may be composed of receiver internal and external noise as well as interference from other transmissions.

Figure 4:
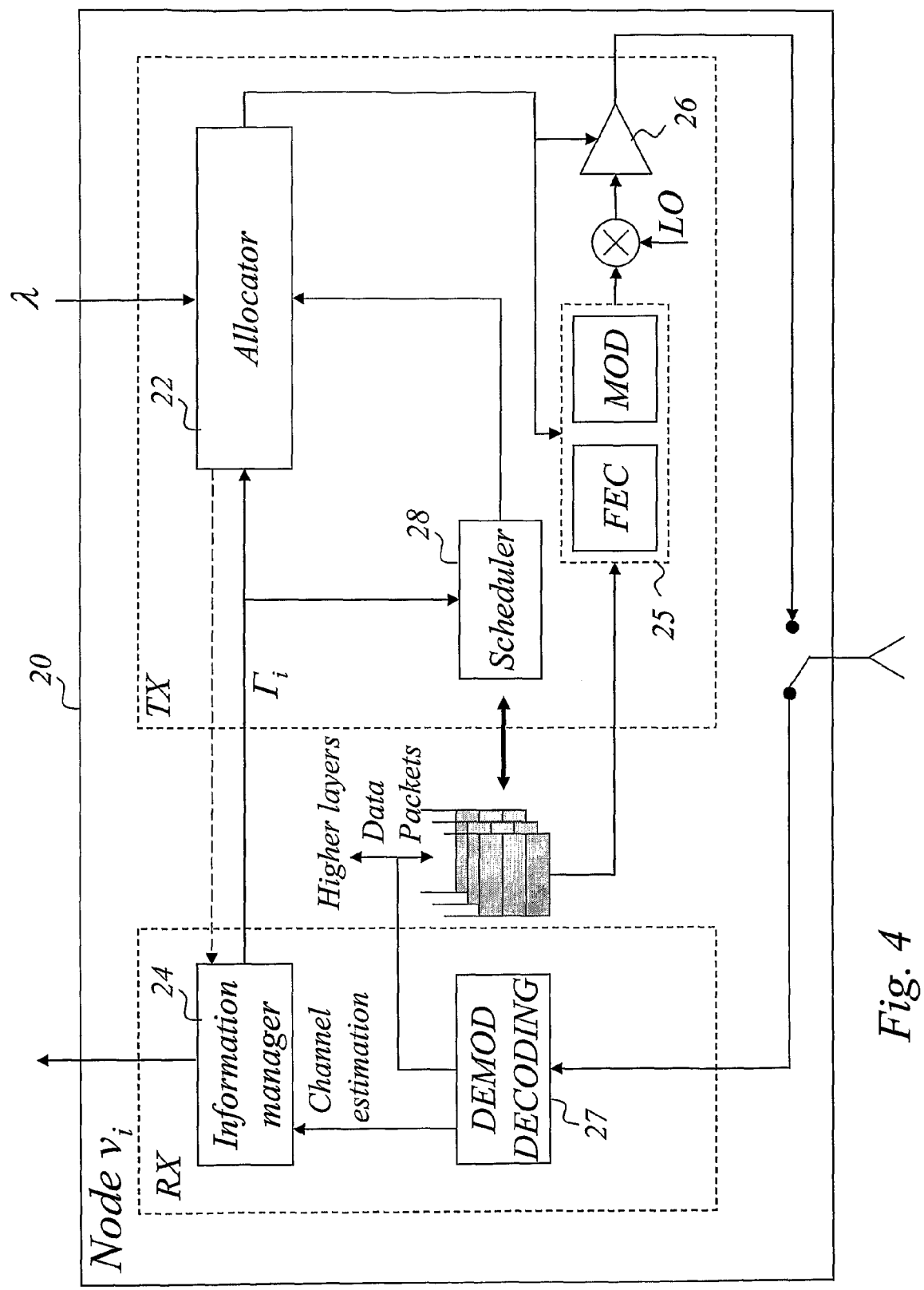
FIG. 4 is a schematic block diagram of a multihop network node according to a particular exemplary embodiment.

FIG. 4 is a schematic block diagram of a multihop network node according to a particular exemplary embodiment. The node 20 is normally divided into a transmission module (TX) and a reception module (RX) using one or more antenna elements. In connection with reception and transmission of data packets, the packets are normally organized in buffers. The transmission module preferably includes an allocator 22, a transmission chain based on a modulation and coding unit 25 and a power amplifier 26, and a scheduler 28. The reception module basically includes the information manager 24, and a demodulation and decoding unit 27. The allocator 22 receives information on the common parameter, such as λ, and local link characteristics $\Gamma_i$, and allocates the link transmit parameters, e.g. by controlling the modulation and coding scheme (MCS) and power setting. If desired, the allocator 22 may also use additional information from the scheduler 28 in the process of allocating suitable link transmit parameters. In the reception module, the information manager 24 typically performs traditional channel estimation as a base for evaluating the local link characteristics. This information, or rather the link gain to noise ratio, may be used in the own node if channel reciprocity can be assumed, or may alternatively be communicated to the node for which the path gain was measured for.

The technology described herein will now be described in more detail with reference to particular examples of optimization scenarios. Basically, the exemplary inventive approach here is to select an ETE parameter to minimize and an ETE parameter as constraint expressed in one of the fundamental physical parameters power, energy and time. Although it is possible to minimize any of the three parameters power, time (or bandwidth or number of code words) and energy under the constraint of any one of the other two non-selected parameters, the main focus will be on a few particularly interesting cases. An interesting example is minimum energy with constrained transmit time. Other examples include minimum transmit time with constrained energy and minimum transmit power with constrained transmit time. In a multicarrier/spreading setting with fixed duration of a transmission, but flexible sub carrier/code word usage, another optimization scenario is to minimize the aggregate (ETE) number of sub carriers/code words used, while retaining the ETE energy fixed (or vice versa).

Although the technology described herein is particularly applicable to rate controlled systems that are non-slotted (such as 802.11), the technology described herein may also provide an approximate solution to fixed resource sized systems (such as time slotted systems). In addition, as mentioned, the technology described herein can be used in a fixed time system allowing flexible bandwidth/code words assignment with the fundamental link transmit parameters based on power, energy and transmit frequency bandwidth/code word usage.

As a first example, a formulation for minimizing aggregate energy for a presumed optimum route with a transmit time constraint is derived[1]. It is also shown that this minimization is also valid for the reverse situation, i.e. minimizing aggregate transmit time for a route with an energy constraint. This analysis, starting off from a known route of links/nodes (and hence also known path losses) acts as a base, and may subsequently in its extension be used to also solve the routing problem. The derivation first uses Shannon capacity limits[2], as Forward Error Correcting (FEC) code performance of today gets very close to this limit, and will be further improved in the future. The derivation is complemented with a presentation of an optimal solution for a throughput-SNR approximation to practical modulation and coding schemes.

[1] In the appendix, it is shown that this derivation technique can be used for minimizing an aggregate ETE power-, rather than energy, metric.
[2] Turbo codes and Low Density Parity Check codes (LDPC) approach the Shannon limit. This validates the assumption of Shannon limits. Also, in practice a limited set of rates may exist, and an exhaustive search among the available rates may be performed, possibly with guidance from the parameters derived here.

Example

Minimum ETE Energy with an ETE Transmit Time Constraint (or Vice Versa)

Figure 5:
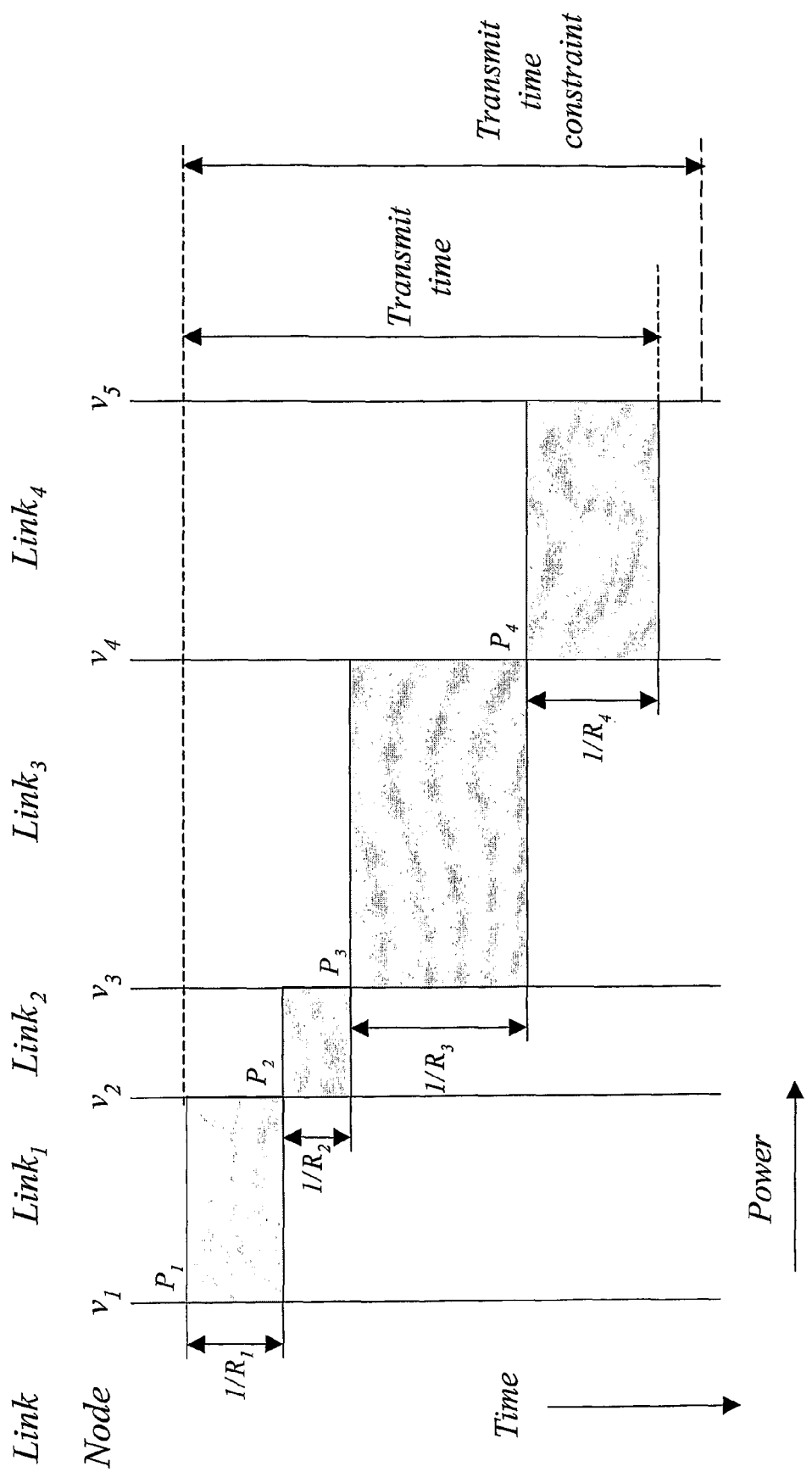
FIG. 5 illustrates a schematic system model for a predetermined route.

It is assumed that a route is composed of a set of N nodes, where each link is indexed with i. The model used here is that arbitrarily power and rate (the rate affects the transmit duration time) can be selected. The illustrative model is shown in FIG. 5, and is applicable to non-slotted systems with rate control (such is 802.11), but the invention is not limited hereto. The invention may for instance be used to find an approximate optimal solution for a communications system using slotted channel access. Then, the duration of a node's transmission is rounded of to the closest number of slots. Hence, multiple slots are potentially used for each packet transmission.

[3] One could also split a packet into multiple segments, and send those concurrently along the same path. This can reduce delay even further, but this is not the standard approach used in multihop networks. Yet, the approach proposed by the invention may be used for this.

The end-to-end transmit time can be written as the sum of the inverse Shannon rate as:

$$T = \sum_{i=1}^{N} T_i = L \sum_{i=1}^{N} \frac{1}{B_i lg_2(1 + \Gamma_i P_i)}, \quad (4)$$

where L is the number of bits in the packet, $\Gamma_i$ is the path gain ($G_i$) to noise power ($W_i = kT_{Amb}B_i$) ratio (k is Boltzman's Constant, and $T_{Amb}$ is the ambient temperature) for link i (note that interference could also be added to the noise term), $P_i$ is the transmit power, N is the number of hops, and $B_i$ is the link bandwidth.

Typically all $B_i$ are identical, but we allow for different bandwidths, e.g. if different access technologies, frequency bands and/or terminal bandwidth capabilities would be considered. Equivalently to the transmit time (or delay), one may also talk about an experienced effective rate. Now, the end-to-end energy can be written as the sum of the energy contribution per hop, i.e. the power times the transmission duration for each hop, which is:

$$E = \sum_{i=1}^{N} E_i = L \sum_{i=1}^{N} \frac{P_i}{B_i lg_2(1 + \Gamma_i P_i)} \quad (5)$$

Below, we consider per-bit transmit time and energy which is sufficient for optimization, i.e. we skip the packet length parameter L.

The Lagrangian multiplier method is applied to the problem of minimizing the energy while using a transmit time constraint. This can be written:

$$\frac{d}{dP_i} \sum_{i=1}^{N} \frac{P_i}{B_i lg_2(1 + \Gamma_i P_i)} + \lambda \frac{d}{dP_i} \left( \sum_{i=1}^{N} \frac{1}{B_i lg_2(1 + \Gamma_i P_i)} - T_0 \right) = 0 \quad (6)$$

where $T_0$ is the desired end-to-end transmit time constraint. This can be cleaned up by removing the $B_i$, taking the partial derivative, and then noting that the $P_i$ values (different links) do not depend directly on each other, except implicitly from the Lagrangian multiplier. The optimality condition is then:

$$\underbrace{(1 + \Gamma_i P_i) \ln(1 + \Gamma_i P_i) - \Gamma_i P_i}_{\text{Can be pre-calculated for } x_i = \Gamma_i P_i} = \underbrace{\Gamma_i \lambda}_{\text{constant and known}} \quad (7)$$

Once $\Gamma_i$ is known, $\lambda$ is selected, giving an optimal link transmit power $P_i$, such that the desired end-to-end transmit time constraint is fulfilled. The link transmit time $T_i$, which is parameterized by $P_i$, may then be calculated as:

$$T_i = \frac{L}{B_i lg_2(1 + \Gamma_i P_i)} \quad (8)$$

whereas the link transmit energy is given by:

$$E_i = \frac{LP_i}{B_i lg_2(1 + \Gamma_i P_i)} \quad (9)$$

The reverse problem, i.e. minimizing the transmit time while using a energy constraint, yields in practice an equivalent formulation to (6) and (7), i.e. the $\lambda$ in (7) only need to be replaced with its inverse, but $\lambda$ is just an arbitrary "constant". Also note that (7) does not depend on the own (or other) link bandwidths $B_i$ as well as the number of bits transmitted L.

Some methods to solve (7) are described in Appendix A. For example, a table look-up method together with trivial substitutions can be used. Some approximate solutions for small values of λ are also presented in the Appendix.

Performance of Route of Nodes

Figure 6:
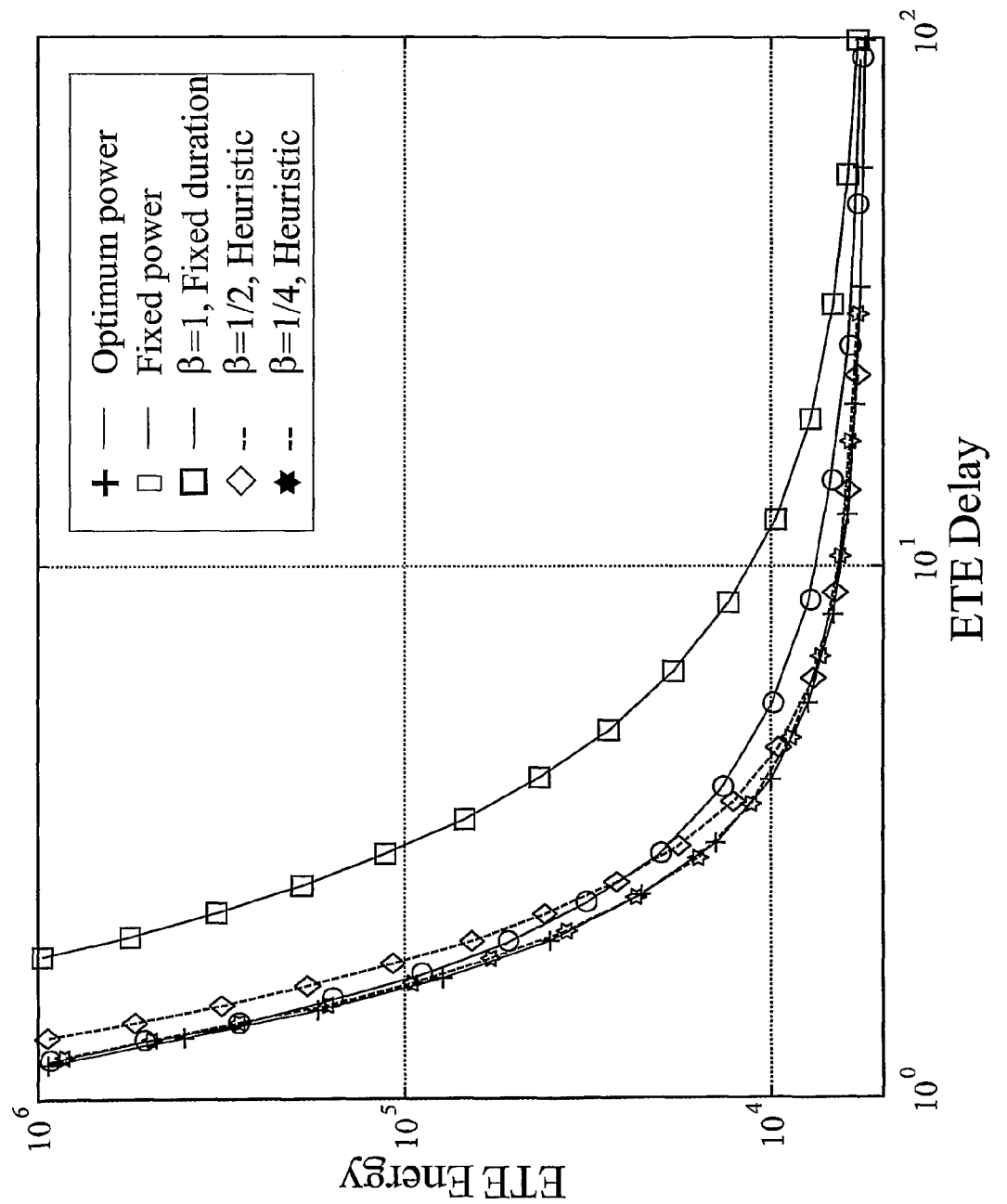
FIG. 6 is a schematic diagram illustrating performance examples of ETE energy vs. ETE transmit time.

A performance example with a 20 node route (uniformly distributed along a line) is given in FIG. 6 and compared with other metrics. FIG. 6 shows the ETE energy vs. ETE transmit time (delay or duration) with a power law propagation loss model $G \propto D^{-\alpha}$, where G is the channel gain, D is the distance, and α is the propagation constant (here α=3.5).

1. The optimum power setting curve uses (7) where λ is varied.
2. For the fixed power curve case, the total ETE power is varied but distributed equally on all links, and hence only the duration (due to different rates) differ between all links. Note that this power-setting scheme often arises in many envisioned multihop networks when power is not settable.
3. For the fixed duration curve case, the total ETE power is varied but distributed such that each link has the same SNR, i.e. β=1 in $P_i \propto \Gamma_i^{-\beta}$. Hence the power differs between all links, but the duration is identical. This power-setting scheme represents a very common assumption in multihop networks.
4. For the first heuristic curve case, the total ETE power is varied but distributed such that each link has $P_i \propto \Gamma_i^{-\beta}$ where β=½.
5. For the second heuristic curve case, the total ETE power is varied but distributed such that each link has $P_i \propto \Gamma_i^{-\beta}$ where β=¼.

In the above, cases 1, 4 and 5 do not constrain power nor duration to any specific value for the different links.

Some conclusions can be drawn from FIG. 6:

Fixed duration transmission is a bad strategy.

Fixed power, but with flexible duration, is a suboptimum strategy but at least for a predetermined route it seems to be not too bad.

Case 4, when β=½, is good at very low SNR as an approximation to the optimum power setting. Yet, case 5 with β¼, is good over a wide range of SNRs.

For further illustration purposes, the transmit time constrained minimum energy problem is solved for a four-hop network with random values of $\Gamma_i$ uniformly distributed in the interval [0,1], and with a desired transmit time of 10 s·Hz/bit. By using (7) and (4), the following parameters can be determined:

| Parameter | Node 1 | Node 2 | Node 3 | Node 4 |
|---|---|---|---|---|
| Γ [1/W] | 0.4813 | 0.0804 | 0.4541 | 0.7879 |
| Power [W] | 0.8842 | 2.0865 | 0.9087 | 0.7024 |
| Rate [bit/s/Hz] | 0.5115 | 0.2238 | 0.4984 | 0.6354 |
| Energy [J · Hz/bit] | 1.7287 | 9.3243 | 1.8232 | 1.1054 |

The above results were achieved for λ=0.1660, where the total energy is 13.9815 [J·Hz/bit].

In addition to the optimization above, one may also perform waterfilling in multicarrier transmissions such as OFDM and then account for frequency selectivity in the channel.

Discretization

In scenarios where transmit durations come in integers of timeslots, in contrast to the situation where transmission of arbitrary duration is assumed, the transmit duration need to be rounded off.

A possibility is to round to closest largest number of timeslots supporting the transmit duration determined in the continuous case. In doing so, the transmit power can be adjusted to minimize energy expenditure, accordingly. In order to do this, the packet length L and the slot duration $T_s$ need to be known. Then, either fixed packet length is assumed or duration may be dynamically adapted to an integer number of slots depending on each packet length. For the latter case, the required number of slots can be calculated as $N_i^{(Slots)} = \lceil L (T_s B \lg_2(1+\Gamma_i P_i))^{-1} \rceil$. From this follows, that the modified power is $P_i^{(Mod)} = \Gamma_i^{-1}(2^{(L(T_s B N_i^{(Slots)})^{-1}}-1)$.

Note that power may also only allow discrete values, so in practice the number of timeslots and power levels may be searched for in discrete spaces.

While Shannon bounds have been used above, in practice a distinct set of modulation and coding scheme may be used. This may also be taken into account in the rounding off process.

Examples of Optimization with Realistic Modulation and Coding Schemes

For the case where practical rates can not be modeled as constant factors less than the Shannon rate, inverse throughput performance curves for different modulation and coding schemes (MCSs) (possibly even taking retransmission effects into account) can be exploited instead of the Shannon rate. Assume that one expresses the inverse of maximum throughput for all performance curves as a function $f(\Gamma_i P_i)$. One may then use this with the Lagrange multiplier method:

$$\frac{d}{dP_i} \sum_{i=1}^{N} \frac{P_i}{B_i f(\Gamma_i P_i)} + \lambda \frac{d}{dP_i}\left(\sum_{i=1}^{N} \frac{1}{B_i f(\Gamma_i P_i)} - T_0\right) = 0 \quad (10)$$

which yields:

$$\frac{f(\Gamma_i P_i)}{f'_{\Gamma_i P_i}(\Gamma_i P_i)} - \Gamma_i P_i = \Gamma_i \lambda \quad (11)$$

for which the left side can be pre-calculated for the MCS schemes used in the system and then used with (11) solution with a table look up.

Figure 7:
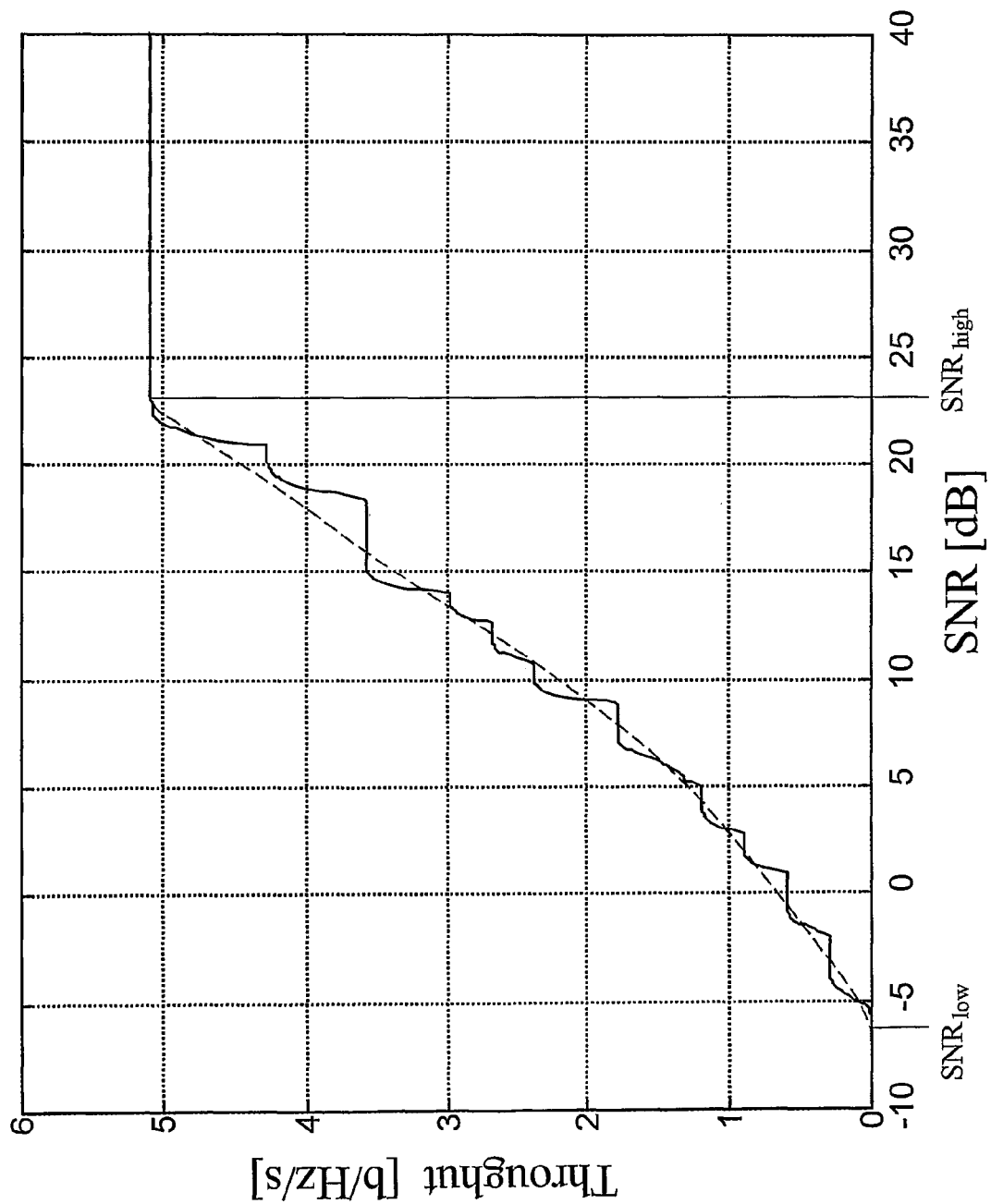
FIG. 7 is a schematic diagram illustrating maximum throughput vs. SNR.

For practical MCSs, the derivative is problematic as is noticed from FIG. 7 showing $f(\Gamma_i P_i) = f(SNR)$, which is the maximum throughput of several MCSs (Turbo coding with 4 QAM to 64 QAM, and accounting for retransmissions). However, an approximation (indicated by the dotted curve) may be used provided that is has a non-zero and continuous "derivative" defined over an SNR interval [$SNR_{low}$, $SNR_{high}$]. Below $SNR_{low}$, the path is infeasible as infinite transmit time result. Above $SNR_{high}$, the transmit time is upper bounded and higher SNRs than $SNR_{high}$ does not need to be considered. Hence:

$$T_i = \begin{cases} N.A., & SNR_i^{(opt)} < SNR_{low} \\ \dfrac{1}{B_i f\left(SNR_i^{(opt)}\right)}, & SNR_{low} < SNR_i^{(opt)} < SNR_{high} \\ \dfrac{1}{B_i f(SNR_{high})}, & SNR_{high} < SNR_i^{(opt)} \end{cases} \quad (12)$$

$$P_i = \begin{cases} N.A., & SNR_i^{(opt)} < SNR_{low} \\ \dfrac{SNR_i^{(opt)}}{G_i}, & SNR_{low} < SNR_i^{(opt)} < SNR_{high} \\ \dfrac{SNR_{high}}{G_i}, & SNR_{high} < SNR_i^{(opt)} \end{cases} \quad (13)$$

$$E_i = \begin{cases} N.A., & SNR_i^{(opt)} < SNR_{low} \\ P_i T_i, & SNR_{low} < SNR_i^{(opt)} < SNR_{high} \\ P_i T_i, & SNR_{high} < SNR_i^{(opt)} \end{cases} \quad (14)$$

Example

Minimum ETE Power with an ETE Transmit Time Constraint (or Vice Versa)

The end-to-end transmit time can be written as the sum of the inverse Shannon rate as in (4). The end-to-end power can be written as the sum of the power contribution per hop:

$$P = \sum_{i=1}^{N} P_i \quad (15)$$

The Lagrangian multiplier method is applied to the problem of minimizing the power while using a transmit time constraint. This can be written as:

$$\frac{d}{dP_i}\sum_{i=1}^{N} P_i + \lambda \frac{d}{dP_i}\left(L\sum_{i=1}^{N}\frac{1}{B_i lg_2(1+\Gamma_i P_i)} - T_0\right) = 0 \quad (16)$$

This may be cleaned up somewhat and the result is:

$$1 - \lambda \frac{L\ln(2)\Gamma_i}{B_i(lg_2(1+\Gamma_i P_i))^2(1+\Gamma_i P)} = 0 \quad (17)$$

This equation is solved for the unknown power $P_i$. Then, the equations above may be used in the same way as those for the energy minimization with respect to power and rate settings (as well as routing as will be apparent later on).

Example

Minimum ETE Energy with an ETE Frequency/Code Word Resource Constraint (or Vice Versa)

This section shows that the same link optimization strategy is applicable when replacing the transmit time (with fixed BW) by the amount of used bandwidth/code words resources (with fixed transmit time). The motivation for this is to show that the model is also useful for multicarrier/spread spectrum communication (such as OFDM/CDMA), i.e. one can adaptively select the amount of bandwidth/code words resources in OFDM/CDMA while the time for an OFDM/CDMA symbol is fixed. In the following, it is assumed that the quality is (at least approximately) equal for all OFDM sub carriers at hop i. The amount of used sub carriers can be written as:

$$F = \sum_{i=1}^{N} F_i = L\sum_{i=1}^{N}\frac{1}{T^{(symb)}B_i^{(Sc)}lg_2(1+\Gamma_i^{(Sc)}P_i^{(Sc)})} \quad (18)$$

where L is the number of bits in the packet, $\Gamma_i^{(sc)}$ is the path gain $G_i$ to noise power $W_i = kT_{Amb}B_i^{(sc)}$ ratio (k is Boltzman's Constant, and $T_{Amb}$ the ambient temperature) for link i (note that interference could also be added to the noise term), $P_i^{(Sc)}$ is the transmit power per sub carrier, N is the number of hops, $B_i^{(Sc)}$ is the link sub carrier bandwidth (typically all $B_i^{(Sc)}$ are identical for different links i, but we allow for different bandwidths, e.g. if different access technologies, frequency bands and terminal bandwidth capabilities would ever be considered), and $T^{(Symb)}$ is the duration of an (OFDM) symbol. The ETE energy is:

$$E = \sum_{i=1}^{N} E_i = L\sum_{i=1}^{N}\frac{P_i^{(Sc)}}{B_i^{(Sc)}lg_2(1+\Gamma_i^{(Sc)}P_i^{(Sc)})} \quad (19)$$

As before, the Lagrangian multiplier method can be applied, and the form of the optimality criterion will be identical to (7), except for some trivial constants.

Although equation (18) and (19) was derived for OFDM, the same equations holds for CDMA with orthogonal words and if higher order modulation (e.g. 4, 16, 64 . . . QAM) and varying forward error correction code rate may be used when spreading each symbol with a code word. More precisely, the number of code words required per link is then $C_i = L/(B^{(C)}lg_2(1+\Gamma_i^{(C)}P_i^{(C)}))$, where (C) indicate that we are concerned with a codeword. In analogous manner, the energy term per link is $E_i = P_i^{(C)}L/(B^{(C)}lg_2(1+\Gamma_i^{(C)}P_i^{(C)}))$. As before, the Lagrangian multiplier method can be applied, and the form of the optimality criterion will be identical to (7), except for some trivial constants.

Example

ETE Considerate Link Control with Protocols

In this section, it is discussed how the link optimality conditions (7) for a given path of nodes/links may be used in an exemplary embodiment.

First, a short comment on how the path may be given. A reasonable heuristic approach to find a path could be to use shortest path routing, or alternatively using the proposed method with a joint route selection, as will be described, with some chosen metric, e.g. energy, power, or transmit duration. If shortest path routing is used with an energy metric, the problem degenerates to finding the path offering the minimum sum of noise to gain ratio per link.

The idea could be implemented with different degrees of centralized, decentralized, or distributed operation. Which approach is preferred depend on scenarios, preferences on architecture, how fast the channel changes (static: slowly changing, line-of-sight channel due to mobility, fast fading), what the optimization goal is (average or instantaneous optimization), and so forth.

Figure 8:
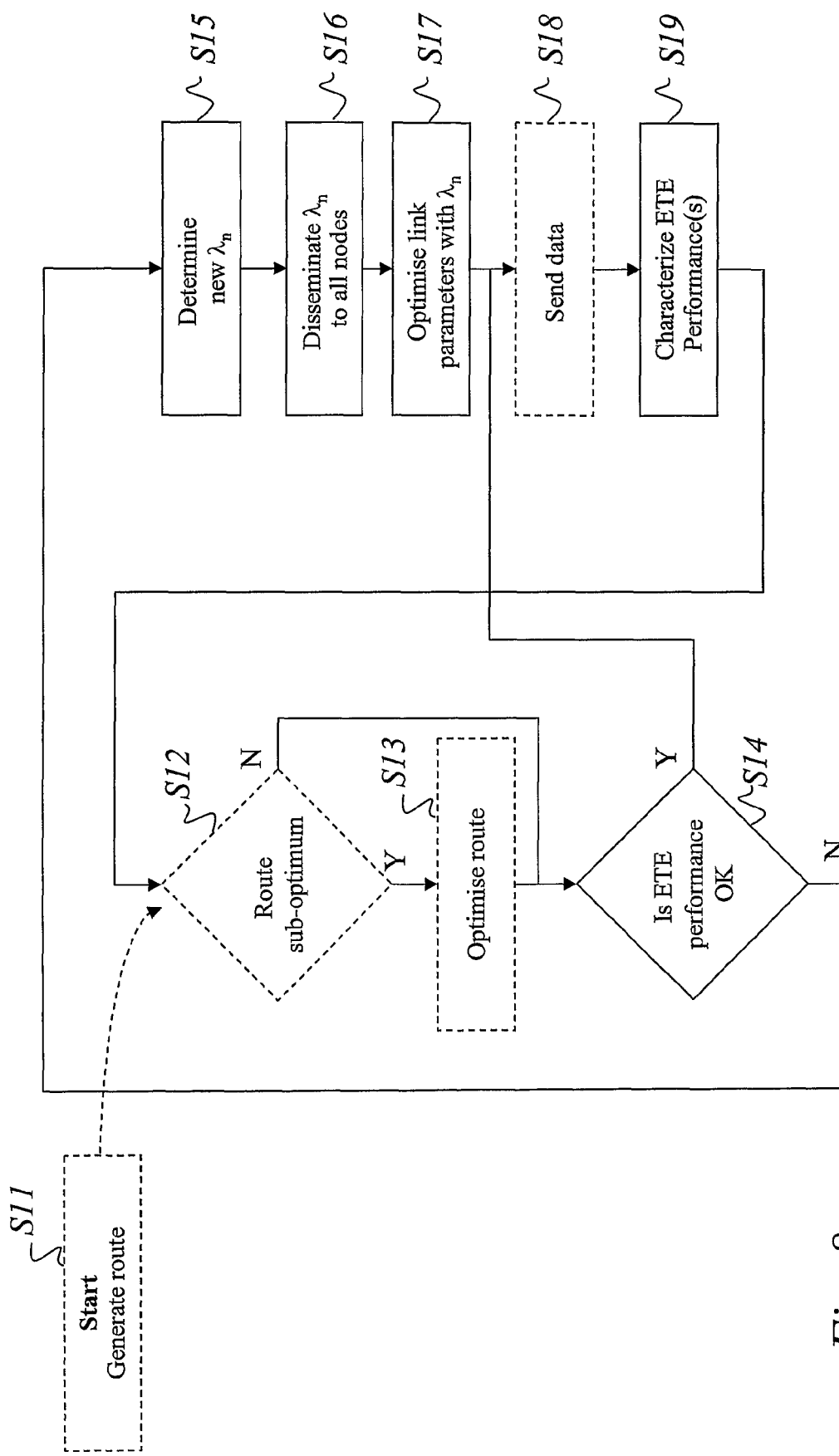
FIG. 8 is a schematic flow diagram illustrating the basic operation according to a particular exemplary embodiment.

In FIG. 8, an exemplary flowchart shows the basic operation. Assuming that a route exists (S11), it is checked whether other routes are more optimal to use, and if so a new route is selected. Those two steps (S12, S13) are optional (indicated with dotted lines), but are preferably included when nodes are mobile or the channel between nodes changes due to other reasons. A check is made (S14) whether the ETE performance is acceptable or need to be retuned. If it is OK (Y), the process preferably continues at S18 where data may be forwarded. At step S19 the ETE performance is characterized and collected for subsequent processing a new value of $\lambda_n$. Next, it may once again be checked whether the route needs to be updated. However, if the ETE performance is not OK (N) at step S14, then the common parameter $\lambda_n$ for all links is recalculated (S15) and updated to better meet a target ETE criterion. The new $\lambda_n$ is distributed (S16) to the nodes along the route and then used (S17) by each node when setting the optimized transmit parameters. Those parameters are then at least used as coarse initial setting for a packet transmission. If the channel gain to noise ratio varies slowly, the correct optimal value of $\lambda_n$ will be used for the full path. However, if the channel varies more rapidly than new values can be distributed, then $\lambda_n$ is preferably determined such that the average ETE performance meets a desired target. While this "average" type of optimization results in variability of ETE performance parameters (e.g. transmit time and energy), it still follows the optimal trade-off curve between the parameter that is minimized and the "constrained" parameter. If data exist, it may be forwarded here (or later) with the new parameters (S18). As a last step (S19), the ETE performance is characterized and collected for processing a new value of $\lambda_n$.

Figure 9:
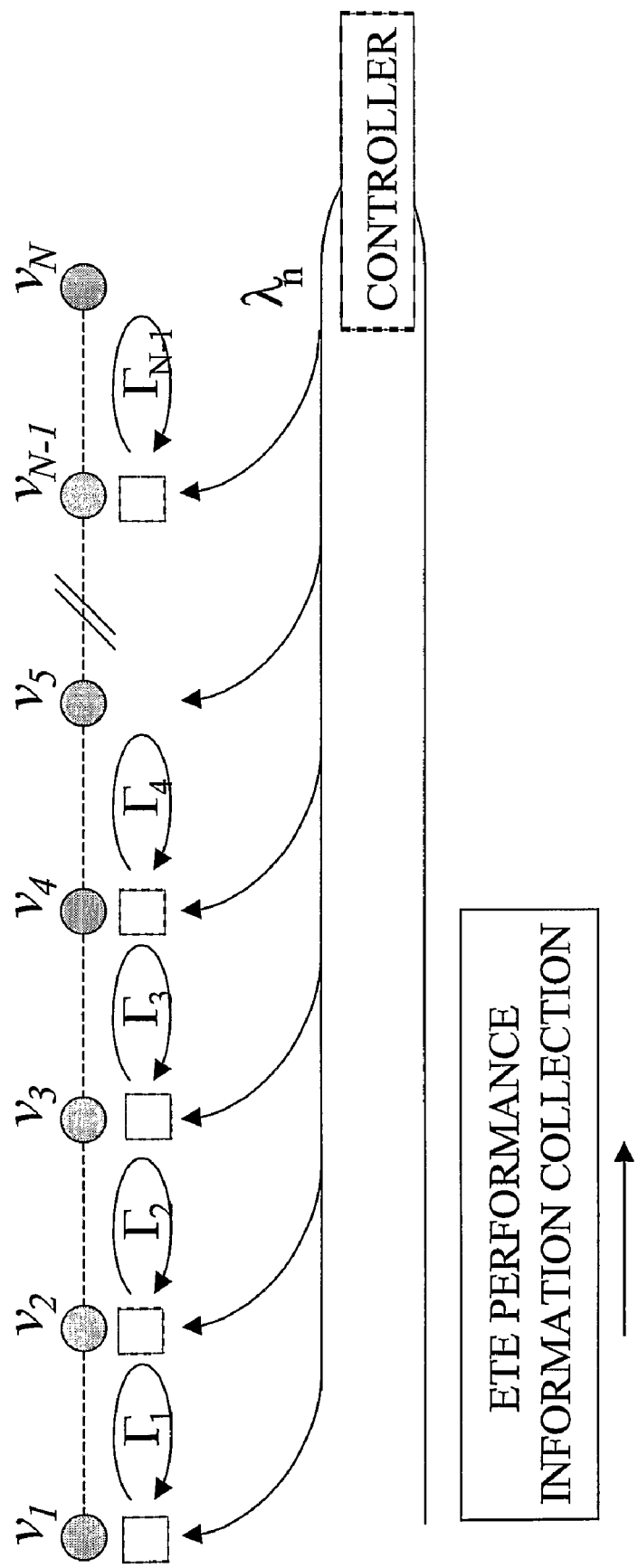
FIG. 9 is a schematic diagram illustrating a multihop route and associated control loops according to an exemplary realization.

Just to illustrate a possible exemplary embodiment of an ETE considerate link control scheme, (e.g. joint link adaptation and power control), consider the route in FIG. 9. Here, ETE performance information is collected along the route. For example, given a value of $\lambda_{n-1}$, the aggregate ETE constraint parameter (and potentially other information facilitating easy determination of a new enhanced $\lambda_n$) is collected and forwarded to a decision-making node, for example let it be $v_N$ in FIG. 9. The node $v_N$ assesses the reported ETE performance and compares it to a desired target measure.

Based on this, a new value, $\lambda_n$, is determined and distributed to the nodes along the route. The ETE performance information may be collected independently of data packet transmissions or could be piggybacked onto data packets. In addition to reporting the main ETE constraint parameter (such as ETE transmit time), it may be desirable to characterize the ETE performance with respect to the minimization parameter (such as ETE energy).

With ETE energy as minimization parameter an alternative embodiment could involve reporting accumulated link noise to gain ratio (which is a measure of the minimum attainable ETE energy). In this alternative embodiment, one may strive to select a value of $\lambda$ that allows the ETE energy to raise a small amount over the minimum attainable ETE energy. In this way, one strikes a good balance between near minimum energy operation, while ensuring that excessive delay is avoided.

The control loops are also indicated in FIG. 9. It is shown that ETE information is collected along the route, processed in a node, and then the value of $\lambda$ is disseminated to the relevant, typically all, nodes along the path. It is also seen that each node determines the gain to noise ratio $\Gamma_i$. Each node then uses these two inputs, $\lambda$ and $\Gamma_i$, to adjust its transmit parameters. In a sense, finding $\Gamma_i$ is an open loop action. Hence, one may envision that each link could potentially also be complemented with a closed loop type of operation.

Example

Extension to Routing

Based on the link control mechanism above, i.e. ETE optimization under an ETE constraint for a given path, a whole set of paths may be selected, optimized and evaluated. For each value of the ETE constraint, the path offering the minimum of the ETE optimized parameters is selected.

Figure 10:
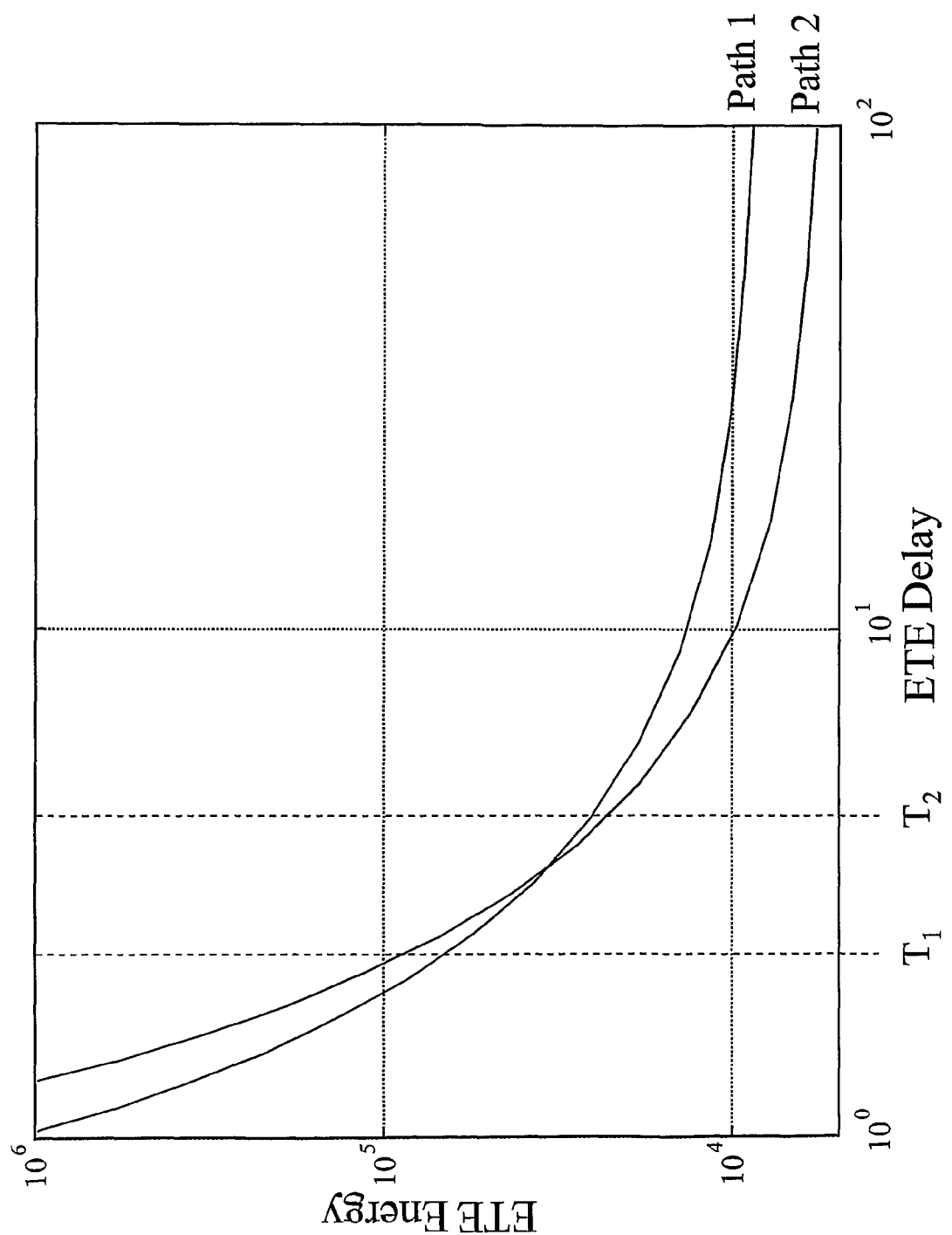
FIG. 10 is a schematic diagram illustrating performance curves of ETE energy vs. ETE transmit time for two different paths (routes)

For link control only it was assumed that a path was given. In the extension with joint routing and link control, it is however suggested to search for the set of paths that optimize the ETE performance in different parameter ranges, e.g. a first path may offer the minimum ETE energy in a certain transmit duration range, while a second path offers minimum ETE energy in another transmit duration range, as schematically illustrated in FIG. 10, which shows the exemplary case of ETE energy vs. ETE delay. With reference to FIG. 10 it can be seen that path 1 provides the minimum ETE energy if the ETE constraint is selected as T1. However, if the ETE constraint is T2, then path 2 provides the minimum ETE energy.

For a limited number of nodes, and/or fixed nodes, an exhaustive search among the possible paths may be feasible. For each path, the parameter $\lambda$ is scanned, such that a performance curve, e.g. ETE energy vs. ETE delay, is generated. The minimum energy vs. delay is then taken for all curves. This allows selecting the jointly optimum route and link parameters achieving any desired ETE constrained parameter while minimizing another parameter. Ideally, this is the most optimal solution that can be found, given the preconditions.

Example

Two-Hop Relaying

Two-hop relaying is an interesting solution for future generation cellular systems, in particular as a coverage enhancer for high data rates.

It is noted that the relay can be made aware of the gain from the base station as well as from the mobile station (simply by overhearing transmissions, beacons or probing signals). Hence, it makes sense to use the relay as the node that determines the transmit parameter setting. The equations that have been derived previously, e.g. (4), (5) and (7) versions may be used. The control loops are also of interest here and are preferably rooted in the relay node.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] Link gain metric [Mills], [Lauer95].
[2] US 2003/0161268 A1.
[3] LIR (Least Interference Routing) [Stevens 88].
[4] LRR (Least Resistance Routing) [Parsley et. al 93].

APPENDIX

This appendix elaborates on various exemplary solution strategies for equation (7).
Exact Solution Over the Full SNR Range
Here follows a short section on how to solve/calculate (7), (5) and (4). There are N equations of the form in (7), one for each link/hop i. The task is to select a $\lambda$, giving powers $P_i$, such that the transmit time constraint in (4) is fulfilled. This involves solving a system of non-linear equations. Off-the-shelf methods for solving non-linear systems of equations may be used for this purpose, e.g. interval halving, Newton-Raphson and so forth. The functions involved are (at closer scrutiny) seen to be well behaved, in the sense that the transmit time T in (4), the energy E in (5), and powers $P_i$ are absolutely monotonically increasing functions with $\lambda$.

Figure 11:
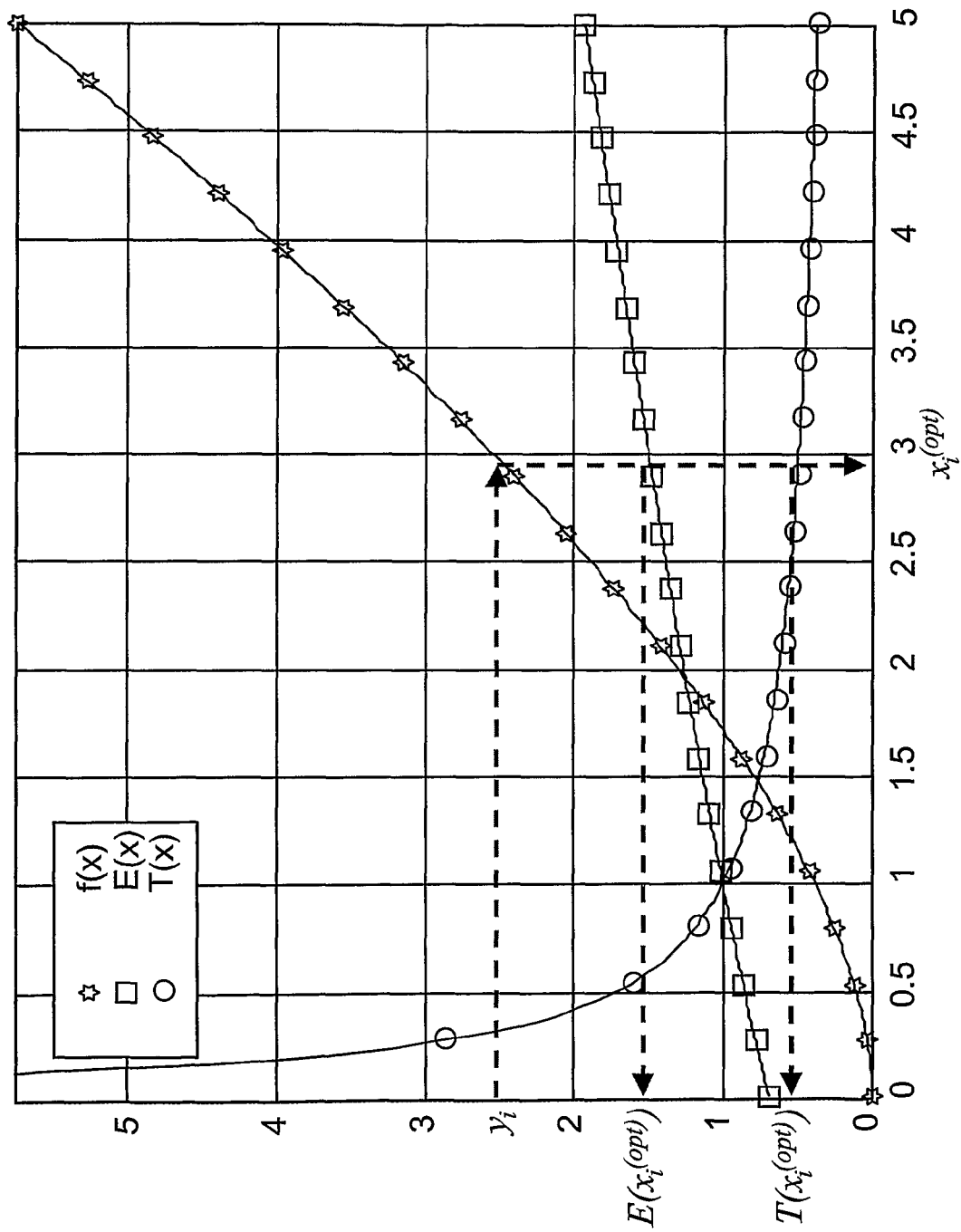
FIG. 11 is a graphical representation of a solution of power, energy and transmit time per link considering the common parameter and local link characteristics.

It is also possible, and perhaps preferable, to solve (7) off-line and use a table look up approach. Given two dummy parameters, $x_i$, $y_i$, a table may be produced by solving for $x_i$ of $(1+x_i)\ln(1+x_i)-x_i=y_i$. Each node, knowing $\Gamma_i$ and $\lambda$, can then determine $P_i$ from $x_i=\Gamma_i P_i$, $y_i=\Gamma_i \lambda$ and the pre-calculated table. Graphically, the power, energy and transmit time per link may for example be derived from the curves illustrated in FIG. 11, with $f(x)=(1+x)\ln(1+x)-x$, $E(x)=x/\log_2(1+x)$, and $T(x)=1/\log_2(1+x)$, where $x_i=\Gamma_i P_i$, $y_i=\Gamma_i \lambda$ and $E_i=E(x_i^{(opt)})\Gamma_i^{-1}B_i^{-1}$, $T_i=T(x_i^{(opt)})B_i^{-1}$, $P_i=x_i^{(opt)}\Gamma_i^{-1}$. Those curves may be used as the basis for the tables. Interpolation between points in the table should be straightforward due to the curves gentle shape.

Approximate Solution in the Low SNR Range

While (7) yields the optimal power setting it is instructive to consider an approximate optimization in the low SNR range, i.e. when $\Gamma_i P_i$ is small. This is achieved by Taylor expansion of the logarithm in (7), with $\Gamma_i P_i$ as argument, according to:

$$(1+\Gamma_i P_i)\left(\Gamma_i P_i - \frac{(\Gamma_i P_i)^2}{2} + O((\Gamma_i P_i)^3)\right) - \Gamma_i P_i = \Gamma_i \lambda. \quad (20)$$

The result is that the power relates to the channel gain as the inverse square root:

$$P_i(\lambda \to 0) \approx \sqrt{\frac{2\lambda}{\Gamma_i}} \quad (21)$$

This hints that power exponents is of interest to examine as heuristic solutions of (7). It has been experimentally verified that $P_i \propto \Gamma_i^{-\beta}$ with $\beta=\{\frac{1}{2}, \ldots, \frac{1}{4}\}$ yields very good results, see FIG. 6. In particular, $\beta=\frac{1}{2}$ is asymptotic optimum at low SNRs, but that $\beta=\{\frac{1}{3}, \ldots, \frac{1}{4}\}$ is better at higher SNRs when the non-linearity of (7) kicks in.

At low SNR, where (21) is valid, the time duration and energy can be approximated with:

$$T_i(\lambda \to 0) \propto \frac{1}{B_i(2\lambda \Gamma_i)^{1/2}}, \quad (22)$$

and $$E_i(\lambda \to 0) \propto \frac{1}{B_i \Gamma_i} \propto \frac{1}{G_i}. \quad (23)$$

The invention claimed is:

1. A method of controlling link parameter values for a multihop route involving at least two links in a multihop network, wherein said method comprises the steps of:
   a first computer-controlled node determining a parameter value common to all links along the entire multihop route based on a given end-to-end (ETE) transmit parameter constraint for the entire multihop route; and
   a second computer-controlled node assigning, for each of a number of said links, a set of the following three interdependent link transmit parameter values, each interdependent link transmit parameter value also being dependent on local link characteristics:
   a link transmit parameter value representative of a link transmit energy;
   a link transmit parameter value representative of a link transmit time; and
   a link transmit parameter value representative of a link transmit power,
   wherein the three interdependent link transmit parameter values are based on said common parameter value and said local link characteristics; and
   the second computer-controlled node using the three interdependent link transmit parameter values when sending data over each of said links,
   wherein said method further comprises collecting link transmit parameter information related to the ETE transmit parameter constraint, forming an aggregated ETE transmit parameter value from the collected link transmit information, and comparing the aggregated ETE transmit parameter value in relation to the given ETE transmit parameter constraint,
   wherein said determining a common parameter value is controlled based on the result of said comparison, and
   wherein said method further comprises distributing said common parameter value to a number of nodes along the multihop route to enable each of said nodes to allocate said set of interdependent link transmit parameter values based on said common parameter value and said local link characteristics.

2. The method of claim 1, wherein said set of interdependent link transmit parameter values is assigned, for each of a number of said links, under said ETE constraint such that all three interdependent link transmit parameter values are generally different between at least two links on the route when said links have different link characteristics.

3. The method of claim 1, wherein said step of assigning, for each of a number of said links, said set of interdependent link transmit parameter values comprises the step of explicitly determining two of said three interdependent link transmit parameter values for use when transmitting information over the respective link, whereby the remaining link transmit parameter value is given by the interdependence of the three link transmit, parameter values, and wherein said common parameter value is determined in the process of optimizing a given objective ETE function with respect to, for each considered link, a first one of the link transmit parameter values under consideration of said ETE constraint, and said step of explicitly determining two of said three interdependent link transmit parameter values comprises the steps of:
   determining said first link transmit parameter value based on said common parameter value and said local link characteristics; and
   determining a second link transmit parameter value as a function of said first link transmit parameter value and local link characteristics, said second link transmit parameter value being parameterized by said first link transmit parameter value.

4. The method of claim 3, wherein said objective ETE function includes one of the end-to-end (ETE) transmit parameter values:
   an ETE transmit parameter value representative of ETE transmit energy;
   an ETE transmit parameter value representative of ETE transmit time or ETE transmit bandwidth or ETE code word consumption; and
   an ETE transmit parameter value representative of ETE transmit power, while another one of the end-to-end (ETE) transmit parameter values acts as said ETE constraint.

5. The method of claim 4, wherein an ETE transmit parameter value representative of ETE transmit energy is optimized under a constraint on an ETE transmit parameter value representative of ETE transmit time or ETE transmit bandwidth or ETE code word consumption.

6. The method of claim 4, wherein an ETE transmit parameter value representative of ETE transmit time or ETE transmit bandwidth or ETE code word consumption is optimized under a constraint on an ETE transmit parameter representative of ETE transmit energy.

7. The method of claim 4, wherein an ETE transmit parameter value representative of ETE transmit power is optimized under a constraint on an ETE transmit parameter value representative of ETE transmit time or ETE transmit bandwidth or ETE code word consumption.

8. The method of claim 4, wherein an ETE transmit parameter value representative of ETE transmit time or ETE transmit bandwidth or ETE code word consumption is optimized under a constraint on an ETE transmit parameter value representative of ETE transmit power.

9. The method of claim 3, wherein said first link parameter value is a link transmit power value, and said second link transmit parameter value is a link transmit rate value, and joint link rate adaptation and link power control is performed based on said determined first and second link transmit parameter value.

10. The method of claim 1, wherein said set of interdependent link transmit parameter value is assigned, for each individual link on said multihop route, under said ETE constraint such that all three link transmit parameter value are different between any two links on the route.

11. The method of claim 1, wherein said method further comprises the steps of collecting link transmit parameter information related to the ETE constrained transmit parameter along the route, forming an aggregated ETE transmit parameter value from the collected link transmit information and comparing the aggregated ETE transmit parameter value in relation to the given ETE transmit parameter constraint, and wherein said step of determining a common parameter value is controlled based on the result of said comparison, and wherein said method further comprises the step of distributing said common parameter value to a number of nodes along the multihop route to enable each of said nodes to allocate said set of interdependent link transmit parameter values based on said common parameter value and said local link characteristics.

12. The method of claim 1, wherein each of said link transmit parameter values is non-linearly dependent on said local link characteristics, and said step of determining a common parameter value is based on non-linear processing.

13. A method of controlling link parameter values for a multihop route involving at least two links in a multihop network, wherein said method comprises the steps of:
a first computer-controlled node determining a parameter value common to all links along the entire multihop route based on a given end-to-end (ETE) transmit parameter constraint for the entire multihop route; and
a second computer-controlled node assigning, for each of a number of said links, a set of the following three interdependent link transmit parameter values, each interdependent link transmit parameter value also being dependent on local link characteristics:
a link transmit parameter value representative of a link transmit energy;
a link transmit parameter value representative of a link transmit time; and
a link transmit parameter value representative of a link transmit power,
wherein the three interdependent link transmit parameter values are based on said common parameter value and said local link characteristics; and
the second computer-controlled node using the three interdependent link transmit parameter values when sending data over each of said links,
wherein said common parameter value is determined in a process of optimizing a given ETE function with respect to for each considered link, a first one of the link transmit parameter values under consideration of said ETE constraint, and
wherein said process of optimizing is performed using the Lagrange multiplier method, and the common parameter is representative of the Lagrange multiplier.

14. A method of routing in a multihop network, wherein said method comprises the steps of:
optimizing, for each of a number of possible routes and subject to a given ETE transmit parameter constraint common for all routes, a given objective end-to-end (ETE) function with respect to, for each link on the respective route, one of the following three interdependent link transmit parameter values:
a link transmit parameter value representative of a link transmit energy;
a link transmit parameter value representative of a link transmit time; and
a link transmit parameter value representative of a link transmit power,
said optimizing being based on a parameter value common to all links along the considered route such that all three interdependent link transmit parameter values, each interdependent link transmit parameter value also being dependent on local link characteristics, are generally different between at least two links on the route when said links have different link characteristics; and
selecting a route among those routes that have the most optimum value of the objective ETE function,
wherein said method further comprises collecting link transmit parameter information related to the ETE transmit parameter constraint, forming an aggregated ETE transmit parameter value from the collected link transmit information, and comparing the aggregated ETE transmit parameter value in relation to the given ETE transmit parameter constraint,
wherein said common parameter value is based on the result of said comparison, and
wherein said method further comprises distributing said common parameter value to a number of nodes along the multihop route to enable each of said nodes to allocate said set of interdependent link transmit parameter values based on said common parameter value and said local link characteristics.

15. An arrangement for controlling link parameter values for a multihop route involving at least two links in a multihop network, said arrangement comprising:
means for determining a parameter value common to all links along the entire multihop route based on a given end-to-end (ETE) transmit parameter constraint for the entire multihop route; and
means for assigning, for each of a number of links on said multihop route, a set of the following three interdependent link transmit parameter values, each interdependent link transmit parameter value also being dependent on local link characteristics:

a link transmit parameter value representative of a link transmit energy;
a link transmit parameter value representative of a link transmit time; and
a link transmit parameter value representative of a link transmit power,
wherein the three interdependent link transmit parameter values are based on said common parameter value and said local link characteristics,
wherein said means for determining said common parameter value comprises means for optimizing a given ETE function with respect to, for each considered link, a first link transmit parameter value under consideration of said ETE constraint, and
wherein said means for optimizing is configured to operate according to a Lagrange multiplier procedure, and the common parameter is representative of the Lagrange multiplier.

16. The arrangement of claim 15, wherein said assigning means is configured to assign, for each of a number of said links, said set of interdependent link transmit parameter values such that all three interdependent link transmit parameter values are generally different between at least two links on the route when said links have different link characteristics.

17. The arrangement of claim 15, wherein said means for assigning, for each of a number of said links, said set of interdependent link transmit parameter values comprises means for explicitly determining two of said three interdependent link transmit parameter values for use when transmitting information over the respective link, whereby the remaining link transmit parameter value is given by the interdependence of the three link transmit parameter values, and said means for explicitly determining two of said three interdependent link transmit parameter values comprises:
    means for determining said first link transmit parameter value based on said common parameter value and said local link characteristics; and
    means for determining a second link transmit parameter value as a function of said first link transmit parameter value and said local link characteristics, said second link transmit parameter value being parameterized by said first link transmit parameter value.

18. The arrangement of claim 17, wherein said objective ETE function includes one of the end-to-end (ETE) transmit parameter values:
    an ETE transmit parameter value representative of ETE transmit energy;
    an ETE transmit parameter value representative of ETE transmit time or ETE transmit bandwidth or ETE code word consumption; and
    an ETE transmit parameter value representative of ETE transmit power,
    while another one of the end-to-end (ETE) transmit parameter values acts as said ETE constraint.

19. The arrangement of claim 17, wherein said first link parameter value is a link transmit power, and said second link transmit parameter value is a link transmit rate, and said arrangement further comprises means for performing joint link rate adaptation and link power control based on said determined first and second link transmit parameter values.

20. The arrangement of claim 15, wherein said assigning means is operable for assigning said set of interdependent link transmit parameter values, for each individual link on said multihop route, under said ETE constraint such that all three link transmit parameter values are different between any two links on the route.

21. The arrangement of claim 15, wherein said arrangement further comprises:
    means for collecting link transmit parameter information related to the ETE constrained transmit parameter along the route;
    means for forming an aggregated ETE transmit parameter value from the collected link transmit information;
    means for comparing the aggregated ETE transmit parameter value in relation to the given ETE transmit parameter constraint,
        wherein said means for determining a common parameter value is controlled based on the comparison result of said means for comparing, and
    wherein said arrangement further comprises means for distributing said common parameter value to a number of nodes along the multihop route, and each node is operable for assigning said set of interdependent link transmit parameter values based on said common parameter value and said local link characteristics.

22. The arrangement of claim 15, wherein said arrangement is implemented in a dedicated control system.

23. An arrangement for routing in a multihop network, said arrangement comprising:
    an optimization controller configured to optimize, for each of a number of possible routes and subject to a given ETE transmit parameter constraint common for all routes, a given objective end-to-end (ETE) function with respect to, for each link on the respective route, one of the following three interdependent link transmit parameter values:
        a link transmit parameter value representative of a link transmit energy;
        a link transmit parameter value representative of a link transmit time; and
        a link transmit parameter value representative of a link transmit power,
    wherein said optimizing is based on a parameter common to all links along the considered route such that all three interdependent link transmit parameter values, each also being dependent on local link characteristics, are generally different between at least two links on the route when said links have different link characteristics; and
    a route selection controller configured to select a route among those routes that have the most optimum value of the objective ETE function,
    wherein optimization controller is configured to collect link transmit parameter information related to the ETE transmit parameter constraint, form an aggregated ETE transmit parameter value from the collected link transmit information, compare the aggregated ETE transmit parameter value in relation to the given ETE transmit parameter constraint, said common parameter value being based on the result of said comparison, and distribute said common parameter value to a number of nodes along the multihop route to enable each of said nodes to allocate said set of interdependent link transmit parameter values based on said common parameter value and said local link characteristics.

24. An apparatus for controlling link parameter values for a multihop route involving at least two links in a multihop network, said apparatus comprising:
    a resource controller configured to determine a parameter value common to all links along the entire multihop route based on a given end-to-end (ETE) transmit parameter constraint for the entire multihop route;

a link transmit parameter allocator configured to allocate, to each of a number of links on said multihop route, a set of the following three interdependent link transmit parameter values, each also being dependent on local link characteristics:
- a link transmit parameter value representative of a link transmit energy;
- a link transmit parameter value representative of a link transmit time; and
- a link transmit parameter value representative of a link transmit power, wherein the three interdependent link transmit parameter values are based on said common parameter value and said local link characteristics, an information manager configured to collect link transmit parameter information related to the ETE transmit parameter constraint, form an aggregated ETE transmit parameter value from the collected link transmit information, and compare the aggregated ETE transmit parameter value in relation to the given ETE transmit parameter constraint, said common parameter value being based on the result of said comparison, and distribute said common parameter value to a number of nodes along the multihop route to enable each of said nodes to allocate said set of interdependent link transmit parameter values based on said common parameter value and said local link characteristics.

* * * * *

UNITED STATES PATENT AND TRADEMARK OFFICE
CERTIFICATE OF CORRECTION

PATENT NO. : 8,295,173 B2
APPLICATION NO. : 11/919880
DATED : October 23, 2012
INVENTOR(S) : Larsson et al.

It is certified that error appears in the above-identified patent and that said Letters Patent is hereby corrected as shown below:

In the Drawings:

In Fig. 7, Sheet 7 of 11, delete "Throughut" and insert -- Throughput --, therefor.

In the Specifications:

In Column 2, Line 20, delete "c$_i$" and insert -- C$_i$ --, therefor.

In Column 4, Line 28, delete "9such" and insert -- (such --, therefor.

In Column 14, Line 9, delete "$P_i^{(Mod)} = \Gamma_i^{-1}(2^{(L(T_s BN_i^{(Slots)})^{-1}} - 1).$" and insert -- $P_i^{(Mod)} = \Gamma_i^{-1}(2^{L(T_s BN_i^{(Slots)})^{-1}} - 1)$ --, therefor.

In Column 18, Line 53, delete "[Parsley et. al 93]." and insert -- [Pursley et al. 93]. --, therefor.

In the Claims:

In Column 20, Line 41, in Claim 3, delete "transmit," and insert -- transmit --, therefor.

In Column 22, Line 11, in Claim 13, delete "to for" and insert -- to, for --, therefor.

Signed and Sealed this
Sixteenth Day of April, 2013

Teresa Stanek Rea
*Acting Director of the United States Patent and Trademark Office*